United States Patent
Liu et al.

(10) Patent No.: US 10,270,509 B2
(45) Date of Patent: Apr. 23, 2019

(54) TRAINING BEAM TRANSMISSION METHOD, APPARATUS, AND SYSTEM

(71) Applicant: HUAWEI TECHNOLOGIES CO., LTD., Shenzhen (CN)

(72) Inventors: Kunpeng Liu, Chengdu (CN); Huang Huang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/878,406

(22) Filed: Jan. 23, 2018

(65) Prior Publication Data

US 2018/0219595 A1 Aug. 2, 2018

Related U.S. Application Data

(63) Continuation of application No. PCT/CN2015/085801, filed on Jul. 31, 2015.

(51) Int. Cl.
*H04B 7/06* (2006.01)
*H04B 7/04* (2017.01)

(52) U.S. Cl.
CPC .......... *H04B 7/0617* (2013.01); *H04B 7/04* (2013.01); *H04B 7/063* (2013.01); *H04B 7/0695* (2013.01)

(58) Field of Classification Search
CPC .. H04B 7/0617; H04B 7/0456; H04B 7/0639; H04B 7/0634; H04B 7/0619; H04B 7/04; H04B 7/063; H04B 7/0695
See application file for complete search history.

(56) References Cited

U.S. PATENT DOCUMENTS

| | | | |
|---|---|---|---|
| 2009/0225813 A1 | 9/2009 | Im et al. | |
| 2011/0316744 A1* | 12/2011 | Morioka | H04W 72/046 342/367 |

(Continued)

FOREIGN PATENT DOCUMENTS

| | | |
|---|---|---|
| CN | 104618964 A | 5/2015 |
| CN | 104734754 A | 6/2015 |

(Continued)

OTHER PUBLICATIONS

IEEE Std 802.15.3c, IEEE Part 15.3: Wireless Medium Access Control (MAC) and Physical layer(PHY) Specifications for High Rate Wireless Personal Area Networks (WPANs), Amendment 2: Milimeter-wave-based Alternative Physical Layer Extension, IEEE Computer Society, Oct. 12, 2009, 203 pages.

(Continued)

*Primary Examiner* — Sung S Ahn
(74) *Attorney, Agent, or Firm* — Kilpatrick Townsend & Stockton LLP

(57) ABSTRACT

The present invention provides a training beam transmission method, an apparatus, and a system. The training beam sending method includes: determining, by a transmit end, a training beam set to be sent to a receive end; sending, by the transmit end to the receive end, indication information indicating a combination vector of the training beam set; and sequentially sending, by the transmit end, training beams in the training beam set to the receive end. According to the training beam transmission method, the apparatus, and the system that are provided in the present invention, overheads required for sending a training beam can be reduced.

19 Claims, 10 Drawing Sheets

(56) References Cited

U.S. PATENT DOCUMENTS

| | | | | |
|---|---|---|---|---|
| 2013/0156120 A1* | 6/2013 | Josiam | ................. | H04B 7/0697 |
| | | | | 375/260 |
| 2013/0315325 A1 | 11/2013 | Wang et al. | | |
| 2014/0334566 A1 | 11/2014 | Kim et al. | | |
| 2015/0016379 A1* | 1/2015 | Nam | .................... | H04B 7/0456 |
| | | | | 370/329 |
| 2015/0341095 A1* | 11/2015 | Yu | ........................ | H04B 7/0619 |
| | | | | 370/252 |
| 2017/0033851 A1 | 2/2017 | Zhong et al. | | |

FOREIGN PATENT DOCUMENTS

| | | |
|---|---|---|
| CN | 104734759 A | 6/2015 |
| WO | 2014153237 A1 | 9/2014 |

OTHER PUBLICATIONS

Emmanuel J. Candes et al, "Near-Optimal Signal Recovery From Random Projections: Universal Encoding Strategies?", IEEE Transactions on Information Theory, vol. 52, No. 12, Dec. 2006, 20 pages.
Dinesh Ramasamy et al, "Compressive tracking with 1000-element arrays: a framework for multi-Gbps mm wave cellular downlinks", Communication, Control, and Computing (Allerton), 2012 50th Annual Allerton Conference on, Oct. 1-5, 2012, 8 pages.
IEEE Std 802.11ad™—2012 Part 11: Wireless LAN Medium Access Control (MAC) and Physical Layer (PHY) Specifications Amendment 3: Enhancements for Very High Throughput in the 60 GHz Band, IEEE Computer Society, Dec. 28, 2012, 628 pages.

* cited by examiner

TRAINING BEAM TRANSMISSION METHOD, APPARATUS, AND SYSTEM

CROSS-REFERENCE TO RELATED APPLICATIONS

This application is a continuation of International Application No. PCT/CN2015/085801, filed on Jul. 31, 2015, the disclosure of which is hereby incorporated by reference in its entirety.

TECHNICAL FIELD

The present invention relates to the field of wireless communications, and in particular, to a training beam transmission method, an apparatus, and a system.

BACKGROUND

With fast development of wireless communications technologies, a larger network capacity is required. However, spectrum resources in conventional wireless communication frequency bands are increasingly insufficient, and cannot satisfy a future requirement for high-speed wireless communications. Therefore, frequency bands above 6 gigahertz (GHz) attract the industry and the academia. There are sufficient spectrum resources on frequency bands above 6 GHz, which can support wireless transmission at gigabits per second (Gbps) in approximately 200 meters. However, during electromagnetic transmission, a space loss is inversely proportional to a wavelength. A higher transmission frequency indicates a shorter wavelength and a larger space loss. Therefore, a space loss generated in wireless transmission using a high frequency band is greater than a space loss in wireless transmission using a low frequency band.

At present, to reduce a transmission loss of a high-frequency spatial channel and increase a coverage area of a base station, a large-scale antenna array is mainly used for high-frequency wireless communications to form a high-gain narrow beam for transmission. In this way, path and reflection losses and the like that are generated due to large channel space during high frequency transmission are offset. Specifically, a larger-dimension antenna array indicates a narrower beam formed and a larger antenna gain. A base station (Base Station, BS for short) and a mobile station (Mobile Station, MS for short) establish a wireless communication link by means of beam pairing. An antenna array on the BS side sends a beam, and an antenna array on the MS side receives a beam. Sweeping is performed on beam directions of both the BS side and the MS side, to find an optimum beam pair and implement beam pairing between the BS side and the MS side. In this way, an optimum communication link is established between the BS side and the MS side.

However, at present, when a large-scale antenna array is used for high-frequency wireless communications to form a high-gain narrow beam for transmission, beam sweeping needs to be performed on both the BS side and the MS side. For example, a dimension of an antenna array on the BS side is 16×16, a beamwidth is approximately 6 degrees (deg), and 60 beams need to be swept in an area covering 60 degrees (deg) of horizontal space and 50 degrees (deg) of vertical space; a dimension of an antenna array on the MS side is 4×4, and 16 beams need to be swept. To establish an optimum communication link between the BS side and the MS side, sweeping needs to be performed 60×16=960 times on the MS side. If one microsecond (µs) is required in each time of sweeping, one millisecond (ms), that is, approximately one LTE subframe, is required to complete the foregoing beam sweeping. Consequently, using beam sweeping to establish and maintain a communication link consumes a quite large proportion of overheads in a high-frequency wireless communication system.

SUMMARY

The present invention provides a training beam transmission method, an apparatus, and a system, to reduce overheads required for sending a training beam.

A training beam sending method provided in a first aspect of the present invention includes:

determining, by a transmit end, a training beam set to be sent to a receive end, where the training beam set includes at least one training beam;

sending, by the transmit end to the receive end, indication information indicating a combination vector of the training beam set, where the combination vector of the training beam set indicates a phase and amplitude weight value of each training beam in the training beam set; and sequentially sending, by the transmit end, the training beams in the training beam set to the receive end.

With reference to the first aspect, in a first possible implementation of the first aspect, after the sequentially sending, by the transmit end, the training beams in the training beam set to the receive end, the method further includes:

receiving, by the transmit end, angle-of-departure information of the training beam set from the receive end; and determining, by the transmit end according to the angle-of-departure information, a transmit beam that reaches the receive end.

With reference to the first aspect or the first possible implementation of the first aspect, in a second possible implementation of the first aspect, the indication information includes the combination vector of the training beam set; or the indication information includes a column quantity of a combination vector set of the training beam set.

With reference to any one of the first aspect to the second possible implementation of the first aspect, in a third possible implementation of the first aspect, the determining, by a transmit end, a training beam set to be sent to a receive end includes:

determining, by the transmit end, a target area corresponding to a beam that is to be sent to the receive end; and using, by the transmit end, the beam that is in a beam set of the transmit end and that is located in the target area, as the training beam set.

With reference to the third possible implementation of the first aspect, in a fourth possible implementation of the first aspect, before the determining, by the transmit end, a target area corresponding to a beam that is to be sent to the receive end, the method further includes:

receiving, by the transmit end, notification information sent by the receive end, where the notification information includes information about the target area.

With reference to any one of the first aspect to the fourth possible implementation of the first aspect, in a fifth possible implementation of the first aspect, the sending, by the transmit end, a combination vector of the training beam set to the receive end includes:

sending, by the transmit end, a basic combination vector and cyclic shift information of the training beam set to the receive end, where the combination vector of the training beam set is obtained by performing cyclic shift processing on the basic combination vector by using the cyclic shift information.

With reference to any one of the first aspect to the fifth possible implementation of the first aspect, in a sixth possible implementation of the first aspect, before the sequentially sending, by the transmit end, the training beams in the training beam set to the receive end, the method further includes:

sending, by the transmit end to the receive end, information that indicates a codebook set of the training beam in the training beam set, where the codebook set specifies a codebook used by each training beam in the training beam set.

With reference to any one of the first aspect to the sixth possible implementation of the first aspect, in a seventh possible implementation of the first aspect, before the sequentially sending, by the transmit end, the training beams in the training beam set to the receive end, the method further includes:

sending, by the transmit end, a determined quantization method for the training beam to the receive end, where the quantization method is that indicates phase quantization information and amplitude quantization information of the training beam in the training beam set.

With reference to the seventh possible implementation of the first aspect, in an eighth possible implementation of the first aspect, before the sequentially sending, by the transmit end, the training beams in the training beam set to the receive end, the method further includes:

generating, by the transmit end, the training beam in the training beam set according to the combination vector of the training beam set, the codebook set of the training beam, and the quantization method.

With reference to the eighth possible implementation of the first aspect, in a ninth possible implementation of the first aspect, the generating, by the transmit end, the training beam in the training beam set according to the combination vector of the training beam set, the codebook set of the training beam, and the quantization method includes:

generating, by the transmit end, the training beam in the training beam set by using a formula $w=\text{quan}(C_\Omega \cdot \varphi)$, where $\varphi$ represents the combination vector of the training beam set, $C_\Omega$ represents the codebook set of the training beam, quan(•) represents the quantization method, and the quantization method is determined jointly by a quantity of phase quantization bits, a quantity of amplitude quantization bits, a normalization method, and a quantization function.

With reference to the ninth possible implementation of the first aspect, in a tenth possible implementation of the first aspect, the quantization method includes:

determining a phase set $$\left\{\frac{2\pi s}{2^S}\right\}_{s=1,2,\ldots,2^S}$$

and an amplitude set $$\left\{\frac{q}{2^Q}\right\}_{q=1,2,\ldots,2^Q}$$

according to the quantity S of phase quantization bits and the quantity Q of amplitude quantization bits;

performing normalization processing on a weight vector w of each training beam; and quantizing the phase set $$\left\{\frac{2\pi s}{2^S}\right\}_{s=1,2,\ldots,2^S}$$

and the amplitude set $$\left\{\frac{q}{2^Q}\right\}_{q=1,2,\ldots,2^Q}.$$

With reference to the third or the fourth possible implementation of the first aspect, in an eleventh possible implementation of the first aspect, each element of the combination vector of the training beam set is obtained by combining an element in a phase set and an element in an amplitude set; and specifically, each element $a_i$ of the combination vector of the training beam set is obtained by means of combination by using a formula $a_i = \alpha_i \cdot e^{j \cdot \beta_i}$, where the element in the phase set is $$\beta_i \in \left\{\frac{2\pi s}{2^S}\right\}_{s=1,2,\ldots,2^S},$$

S represents a quantity of phase quantization bits, the element in the amplitude set is $$\alpha_i \in \left\{\frac{q}{2^Q}\right\}_{q=1,2,\ldots,2^Q},$$

Q represents a quantity of amplitude quantization bits, i=1, 2 . . . , |∩|, and |Ω| represents a length of a coverage area of the target area.

A training beam receiving method provided in a second aspect of the present invention includes:

receiving, by a receive end, indication information that is that indicates a combination vector of a training beam set and that is sent by a transmit end, where the combination vector of the training beam set indicates a phase and amplitude weight value of each training beam in the training beam set;

obtaining, by the receive end, a weight value of each training beam in the training beam set according to the combination vector of the training beam set; and sequentially receiving, by the receive end according to the weight value of each training beam in the training beam set, the training beams in the training beam set that are sent by the transmit end.

With reference to the second aspect, in a first possible implementation of the second aspect, after the sequentially receiving, by the receive end according to the weight value of each training beam in the training beam set, the training beams in the training beam set that are sent by the transmit end, the method further includes:

computing, by the receive end, angle-of-departure information of the training beam set; and feeding back, by the receive end, the angle-of-departure information of the training beam set to the transmit end, where the angle-of-departure information is used by the transmit end to determine, according to the angle-of-departure information, a transmit beam that reaches the receive end.

With reference to the second aspect or the first possible implementation of the second aspect, in a second possible implementation of the second aspect, the indication information includes the combination vector of the training beam set; or the indication information includes a column quantity of a combination vector set of the training beam set.

With reference to any one of the second aspect to the second possible implementation of the second aspect, in a third possible implementation of the second aspect, before the obtaining, by the receive end, a weight value of each training beam in the training beam set according to the combination vector of the training beam set, the method further includes:

receiving, by the receive end, a determined target area corresponding to a beam and that is sent by the transmit end, where the target area is that indicates the training beam set that the transmit end determines to send to the receive end.

With reference to the third possible implementation of the second aspect, in a fourth possible implementation of the second aspect, after the receiving, by the receive end, a determined target area corresponding to a beam and that is sent by the transmit end, the method further includes:

sending, by the receive end, notification information to the transmit end, where the notification information includes information about the target area.

With reference to any one of the second aspect to the fourth possible implementation of the second aspect, in a fifth possible implementation of the second aspect, the receiving, by a receive end, a combination vector, sent by a transmit end, of a training beam set includes:

receiving, by the receive end, a basic combination vector and cyclic shift information of the training beam set that are sent by the transmit end; and performing, by the receive end, cyclic shift processing on the basic combination vector by using the cyclic shift information, to obtain the combination vector of the training beam set.

With reference to any one of the second aspect to the fifth possible implementation of the second aspect, in a sixth possible implementation of the second aspect, before the obtaining, by the receive end, a weight value of each training beam in the training beam set according to the combination vector of the training beam set, the method further includes:

receiving, by the receive end, information that is that indicates a codebook set of the training beam in the training beam set and that is sent by the transmit end, where the codebook set specifies a codebook used by each training beam in the training beam set.

With reference to any one of the second aspect to the sixth possible implementation of the second aspect, in a seventh possible implementation of the second aspect, before the obtaining, by the receive end, a weight value of each training beam in the training beam set according to the combination vector of the training beam set, the method further includes:

receiving, by the receive end, a determined quantization method for the training beam, where the quantization method is sent by the transmit end and is that indicates phase quantization information and amplitude quantization information of the training beam in the training beam set.

With reference to the seventh possible implementation of the second aspect, in an eighth possible implementation of the second aspect, the obtaining, by the receive end, a weight value of each training beam in the training beam set according to the combination vector of the training beam set includes:

computing, by the receive end, the weight vector w of each training beam in the training beam set according to the combination vector of the training beam set by using a formula $w = \text{quan}(C_\Omega \cdot \varphi)$, where $\varphi$ represents the combination vector of the training beam set, $C_\Omega$ represents the codebook set of the training beam, quan(•) represents the quantization method, and the quantization method is determined jointly by a quantity of phase quantization bits, a quantity of amplitude quantization bits, a normalization method, and a quantization function.

With reference to the eighth possible implementation of the second aspect, in a ninth possible implementation of the second aspect, the quantization method includes:

determining a phase set $$\left\{\frac{2\pi s}{2^S}\right\}_{s=1,2,\ldots,2^S}$$

and an amplitude set $$\left\{\frac{q}{2^Q}\right\}_{q=1,2,\ldots,2^Q}$$

according to the quantity S of phase quantization bits and the quantity Q of amplitude quantization bits;

performing normalization processing on the weight vector w of each training beam; and quantizing the phase set $$\left\{\frac{2\pi s}{2^S}\right\}_{s=1,2,\ldots,2^S}$$

and the amplitude set $$\left\{\frac{q}{2^Q}\right\}_{q=1,2,\ldots,2^Q}.$$

With reference to the ninth possible implementation of the second aspect, in a tenth possible implementation of the second aspect, the computing, by the receive end, angle-of-departure information of the training beam set includes:

computing, by the receive end, the angle-of-departure information of the training beam set according to a compressive sensing framework; and specifically, computing the angle-of-departure information of the training beam set by using the following formula:

$$\min_{h_T \in C^\Omega} \|h_T\|_0$$

$$\text{s.t. } \|y - W_T^T C_\Omega h_T\| \le \varepsilon,$$

where $h_T$ represents the angle-of-departure information of the training beam set, each non-zero element of $h_T$ corresponds to one angle of departure, y represents information, sent by the transmit end and received by the receive end, about the training beam in the training beam set, $w_T$ represents a matrix including the weight vector w of the training beam, and $w_T^T$ represents a transpose of the matrix $w_T$.

With reference to the third or the fourth possible implementation of the second aspect, in an eleventh possible implementation of the second aspect, each element of the combination vector of the training beam set is obtained by combining an element in a phase set and an element in an amplitude set; and specifically, each element $a_i$ of the combination vector of the training beam set is obtained by means of combination by using a formula $a_i = \alpha_i \cdot e^{j \cdot \beta_i}$, where the element in the phase set is $$\beta_i \in \left\{ \frac{2\pi s}{2^S} \right\}_{s=1,2,\ldots,2^S},$$

S represents a quantity of phase quantization bits, the element in the amplitude set is $$\alpha_i \in \left\{ \frac{q}{2^Q} \right\}_{q=1,2,\ldots,2^Q},$$

Q represents a quantity of amplitude quantization bits, i=1, 2 . . . , |Ω|, and |Ω| represents a length of a coverage area of the target area.

A third aspect of the present invention provides a base station, including:

a determining unit, configured for the base station to determine a training beam set to be sent to a terminal, where the training beam set includes at least one training beam;

a sending unit, configured for the base station to send, to the terminal, indication information indicating a combination vector of the training beam set, where the combination vector of the training beam set indicates a phase and amplitude weight value of each training beam in the training beam set; and a training unit, configured for the base station to sequentially send the training beams in the training beam set to the terminal.

With reference to the third aspect, in a first possible implementation of the third aspect, the base station further includes:

a receiving unit, configured for the base station to receive angle-of-departure information of the training beam set, fed back by the terminal; and a configuration unit, configured for the base station to determine, according to the angle-of-departure information, a transmit beam that reaches the terminal.

With reference to the third aspect or the first possible implementation of the third aspect, in a second possible implementation of the third aspect, the sending unit is further configured to:

send, by the base station, the combination vector of the training beam set to the terminal; or send, by the base station, a column quantity of a combination vector set of the training beam set to the terminal.

With reference to any one of the third aspect to the second possible implementation of the third aspect, in a third possible implementation of the third aspect, the determining unit is further configured for the base station to:

determine a target area corresponding to a beam that is to be sent to the terminal; and use the beam that is in a beam set of the base station and that is located in the target area, as the training beam set.

With reference to the third possible implementation of the third aspect, in a fourth possible implementation of the third aspect, the determining unit is further configured for the base station to:

receive notification information sent by the terminal, where the notification information includes information about the target area.

With reference to any one of the third aspect to the fourth possible implementation of the third aspect, in a fifth possible implementation of the third aspect, the sending unit is further configured for the base station to:

send a basic combination vector and cyclic shift information of the training beam set to the terminal, where the combination vector of the training beam set is obtained by performing cyclic shift processing on the basic combination vector by using the cyclic shift information.

With reference to any one of the third aspect to the fifth possible implementation of the third aspect, in a sixth possible implementation of the third aspect, the sending unit is further configured for the base station to:

send, to the terminal, information that indicates a codebook set of the training beam in the training beam set, where the codebook set specifies a codebook used by each training beam in the training beam set.

With reference to any one of the third aspect to the sixth possible implementation of the third aspect, in a seventh possible implementation of the third aspect, the sending unit is further configured for the base station to:

send a determined quantization method for the training beam to the terminal, where the quantization method is that indicates phase quantization information and amplitude quantization information of the training beam in the training beam set.

With reference to the seventh possible implementation of the third aspect, in an eighth possible implementation of the third aspect, the training unit is further configured for the base station to:

generate the training beam in the training beam set according to the combination vector of the training beam set, the codebook set of the training beam, and the quantization method.

With reference to the eighth possible implementation of the third aspect, in a ninth possible implementation of the third aspect, the training unit is further configured for the base station to:

generate the training beam in the training beam set by using a formula w=quan($C_\Omega \cdot \varphi$), where $\varphi$ represents the combination vector of the training beam set, $C_\Omega$ represents the codebook set of the training beam, quan(•) represents the quantization method, and the quantization method is determined jointly by a quantity of phase quantization bits, a quantity of amplitude quantization bits, a normalization method, and a quantization function.

With reference to the ninth possible implementation of the third aspect, in a tenth possible implementation of the third aspect, the training unit is further configured to:

determine a phase set $$\left\{ \frac{2\pi s}{2^S} \right\}_{s=1,2,\ldots,2^S}$$

and an amplitude set $$\left\{\frac{q}{2^Q}\right\}_{q=1,2,\ldots,2^Q}$$

according to the quantity S of phase quantization bits and the quantity Q of amplitude quantization bits;

perform normalization processing on a weight vector w of each training beam; and quantize the phase set $$\left\{\frac{2\pi s}{2^S}\right\}_{s=1,2,\ldots,2^S}$$

and the amplitude set $$\left\{\frac{q}{2^Q}\right\}_{q=1,2,\ldots,2^Q}.$$

With reference to the third or the fourth possible implementation of the third aspect, in an eleventh possible implementation of the third aspect, the determining unit is further configured to:

each element of the combination vector of the training beam set is obtained by combining an element in a phase set and an element in an amplitude set; and specifically, each element $a_i$ of the combination vector of the training beam set is obtained by means of combination by using a formula $a_i = \alpha_i \cdot e^{j \cdot \beta_i}$, where the element in the phase set is $$\beta_i \in \left\{\frac{2\pi s}{2^S}\right\}_{s=1,2,\ldots,2^S},$$

S represents a quantity of phase quantization bits, the element in the amplitude set is $$\alpha_i \in \left\{\frac{q}{2^Q}\right\}_{q=1,2,\ldots,2^Q},$$

Q represents a quantity of amplitude quantization bits, i=1, 2 . . . , |Ω|, and |Ω| represents a length of a coverage area of the target area.

A terminal provided in a fourth aspect of the present invention includes:

a receiving unit, configured to receive indication information that is that indicates a combination vector of a training beam set and that is sent by a base station, where the combination vector of the training beam set indicates a phase and amplitude weight value of each training beam in the training beam set;

a first computation unit, configured to obtain a weight value of each training beam in the training beam set according to the combination vector of the training beam set; and a training unit, configured to sequentially receive, according to the weight value of each training beam in the training beam set, the training beams in the training beam set that are sent by the base station.

With reference to the fourth aspect, in a first possible implementation of the fourth aspect, the terminal further includes:

a second computation unit, configured to compute angle-of-departure information of the training beam set; and a feedback unit, configured to feed back the angle-of-departure information of the training beam set to the base station, where the angle-of-departure information is used by the base station to determine, according to the angle-of-departure information, a transmit beam that reaches the terminal.

With reference to the fourth aspect or the first possible implementation of the fourth aspect, in a second possible implementation of the fourth aspect, the receiving unit is specifically configured to:

receive the combination vector of the training beam set, sent by the base station; or receive a column quantity of a combination vector set of the training beam set, sent by the base station.

With reference to any one of the fourth aspect to the second possible implementation of the fourth aspect, in a third possible implementation of the fourth aspect, the receiving unit is further configured to:

receive a determined target area corresponding to a beam and that is sent by the base station, where the target area is that indicates the training beam set that the base station determines to send to the terminal.

With reference to the third possible implementation of the fourth aspect, in a fourth possible implementation of the fourth aspect, the feedback unit is further configured to:

send notification information to the base station, where the notification information includes information about the target area.

With reference to any one of the fourth aspect to the fourth possible implementation of the fourth aspect, in a fifth possible implementation of the fourth aspect, the receiving unit is specifically configured to:

receive a basic combination vector and cyclic shift information of the training beam set that are sent by the base station; and perform cyclic shift processing on the basic combination vector by using the cyclic shift information, to obtain the combination vector of the training beam set.

With reference to any one of the fourth aspect to the fifth possible implementation of the fourth aspect, in a sixth possible implementation of the fourth aspect, the receiving unit is further configured to:

receive information that is that indicates a codebook set of the training beam in the training beam set and that is sent by the base station, where the codebook set specifies a codebook used by each training beam in the training beam set.

With reference to any one of the fourth aspect to the sixth possible implementation of the fourth aspect, in a seventh possible implementation of the fourth aspect, the receiving unit is further configured to:

receive a determined quantization method for the training beam, where the quantization method is sent by the base station and is that indicates phase quantization information and amplitude quantization information of the training beam in the training beam set.

With reference to the seventh possible implementation of the fourth aspect, in an eighth possible implementation of the fourth aspect, the first computation unit is specifically configured to:

compute the weight vector w of each training beam in the training beam set according to the combination vector of the training beam set by using a formula w=quan($C_\Omega \cdot \varphi$), where $\varphi$ represents the combination vector of the training beam set, $C_\Omega$ represents the codebook set of the training beam, quan(•) represents the quantization method, and the quantization method is determined jointly by a quantity of phase quantization bits, a quantity of amplitude quantization bits, a normalization method, and a quantization function.

With reference to the eighth possible implementation of the fourth aspect, in a ninth possible implementation of the fourth aspect, the first computation unit is further configured to:

determine a phase set $$\left\{\frac{2\pi s}{2^S}\right\}_{s=1,2,\ldots,2^S}$$

and an amplitude set $$\left\{\frac{q}{2^Q}\right\}_{q=1,2,\ldots,2^Q}$$

according to the quantity S of phase quantization bits and the quantity Q of amplitude quantization bits;

perform normalization processing on the weight vector w of each training beam; and quantize the phase set $$\left\{\frac{2\pi s}{2^S}\right\}_{s=1,2,\ldots,2^S}$$

and the amplitude set $$\left\{\frac{q}{2^Q}\right\}_{q=1,2,\ldots,2^Q}.$$

With reference to the ninth possible implementation of the fourth aspect, in a tenth possible implementation of the fourth aspect, the second computation unit is specifically configured to:

compute the angle-of-departure information of the training beam set according to a compressive sensing framework; and specifically, compute the angle-of-departure information of the training beam set by using the following formula:

$$\min_{h_T \in C^\Omega} \|h_T\|_0$$
$$\text{s.t. } \|y - W_T^T C_\Omega h_T\| \leq \varepsilon,$$

where $h_T$ represents the angle-of-departure information of the training beam set, each non-zero element of $h_T$ corresponds to one angle of departure, y represents information, sent by the base station and received by the terminal, about the training beam in the training beam set, $w_T$ represents a matrix including the weight vector w of the training beam, and $w_T^T$ represents a transpose of the matrix $w_T$.

With reference to the third or the fourth possible implementation of the fourth aspect, in an eleventh possible implementation of the fourth aspect, the first computation unit is further configured to:

each element of the combination vector of the training beam set is obtained by combining an element in a phase set and an element in an amplitude set; and specifically, each element $a_i$ of the combination vector of the training beam set is obtained by means of combination by using a formula $a_i = \alpha_i \cdot e^{j\beta_i}$, where the element in the phase set is $$\beta_i \in \left\{\frac{2\pi s}{2^S}\right\}_{s=1,2,\ldots,2^S},$$

S represents a quantity of phase quantization bits, the element in the amplitude set is $$\alpha_i \in \left\{\frac{q}{2^Q}\right\}_{q=1,2,\ldots,2^Q},$$

Q represents a quantity of amplitude quantization bits, i=1, 2 . . . , |Ω|, and |Ω| represents a length of a coverage area of the target area.

A beam transmission system provided in a fifth aspect of the present invention includes the base station according to any one of the third aspect to the eleventh possible implementation of the third aspect and the terminal according to any one of the fourth aspect to the eleventh possible implementation of the fourth aspect.

According to the training beam transmission method, the apparatus, and the system that are provided in the present invention, the transmit end sends only the combination vector of the training beam set to the receive end, and the transmit end does not need to send a weight value of the training beam set to the receive end, so that overheads required for sending a training beam are reduced.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without undue experiment shall fall within the protection scope of the present invention.

In a wireless communications technology, especially in a high-frequency wireless communications technology, a high-gain training antenna is required to reduce a transmission loss of a high-frequency spatial channel and increase a coverage area of a base station. At present, a beamforming technology implemented by a large-scale antenna array is mainly used to form a high-gain narrow beam for transmission, and establish an optimum communication link between a base station (Base Station, BS for short) and a mobile station (Mobile Station, MS for short), so as to offset path and reflection losses and the like that are generated due to large channel space during high frequency transmission. A basic principle of the beamforming technology implemented by the large-scale antenna array is: Each beam that is formed by using the antenna array corresponds to a central direction to which the beam points and a coverage area of the beam, each beam formed by each codebook with a beamwidth may cover whole space, an optimum beam pair can be obtained after sweeping is performed on beams generated by the antenna array, and formed beams of the BS and the MS point to the optimum beam pair. In this way, the optimum communication link can be established between the BS and the MS.

Figure 1:
FIG. 1 is a schematic diagram of performing sweeping and pairing on beams formed by an antenna array in the prior art.

FIG. 1 is a schematic diagram of performing sweeping and pairing on beams formed by an antenna array in the prior art. As shown in FIG. 1, a BS includes a transmit antenna array for sending a wireless signal, and the transmit antenna array is configured to transmit a beam; an MS includes a receive antenna array for receiving a wireless signal, and the receive antenna array is configured to receive a beam. The BS uses a specific transmit beam to send a reference signal. The BS sends M beams: $b_0, b_1, \ldots b_M$, and an antenna array of the MS forms N beams: $c_0, c_1, \ldots c_N$. Each of the N beams in the MS receives a reference signal sent by each of the M beams in the BS. After the MS completes sweeping of the M beams sent by the BS, the MS obtains an optimum communications beam pair by computing information such as received signal power and a signal-to-noise ratio, so as to establish an optimum communication link between the BS and the MS.

However, when sweeping and pairing are performed on beams of an antenna array, each beam sent by the BS needs to be swept for each beam in the MS, and approximately M×N times of sweeping need to be performed to establish a communication link between the BS and the MS. As a result, it takes a long time to establish the communication link between the BS and the MS, and overheads required for sending a training beam are quite high.

A technical problem to be resolved by the present invention is how to reduce a time for establishing a communication link and reduce overheads required for sending a training beam when the communication link is determined for sending the training beam between the BS side and the MS side.

A main idea of the present invention is: When a communication link is established and a training beam that needs to be sent by a transmit end to a receive end is determined, the transmit end sends a combination vector of a training beam set to the receive end; the receive end receives the combination vector, sent by the transmit end, of the training beam set; and the receive end obtains a weight value of each training beam in the training beam set according to the combination vector of the training beam set, and the transmit end does not need to directly send the weight value of each training beam in the training beam set to the receive end. In this way, a time for establishing the communication link is reduced, and overheads required for sending the training beam are reduced.

The following describes the technical solutions of the present invention in detail by using specific embodiments. The following several specific embodiments may be combined, and a same or similar concept or process may not be repeated in some embodiments.

Figure 2:
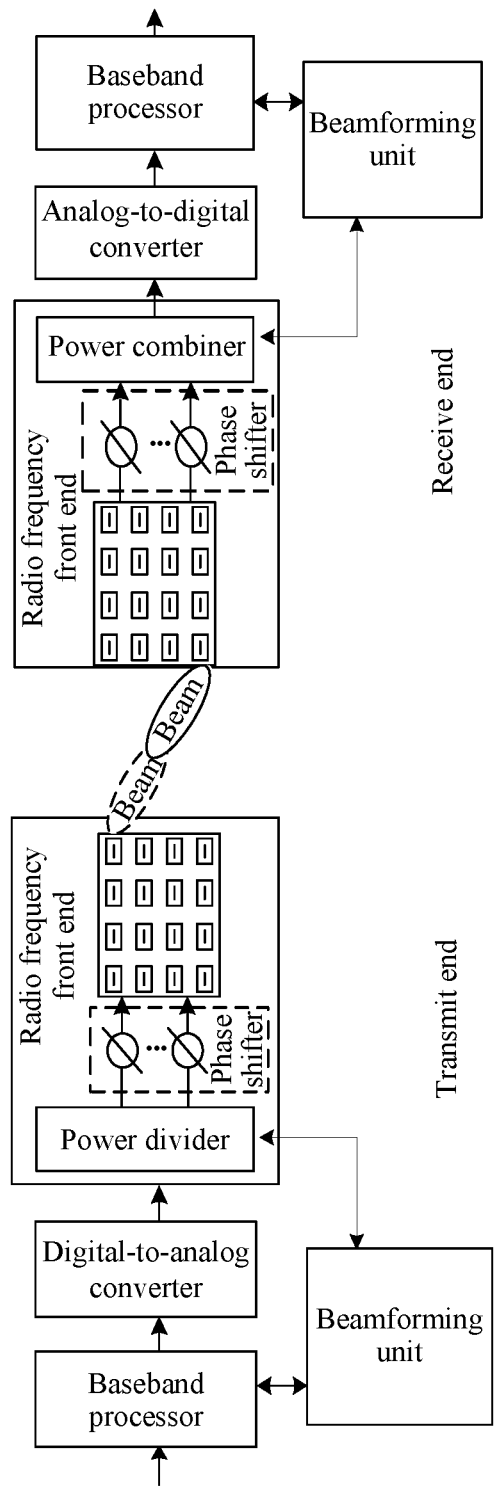
FIG. 2 is a schematic diagram of a system including a transmit end and a receive end according to an embodiment of the present invention.

FIG. 2 is a schematic diagram of a system including a transmit end and a receive end according to an embodiment of the present invention. The present invention provides a beamforming transceiver system shown in FIG. 2. The transmit end includes a radio frequency front end (Radio Front), a digital-to-analog converter (D/A), a baseband processor (Baseband processor), and a beamforming unit (Beamforming Unit). The receive end includes a radio frequency front end (Radio Front), an analog-to-digital converter (A/D), a baseband processor (Baseband processor), and a beamforming unit (Beamforming Unit). The baseband processor of the transmit end performs processing such as quadrature amplitude modulation (Quadrature Amplitude Modulation, QAM for short), forming, and framing on data from Media Access control (Media Access Control, MAC for short), and inputs processed data to the digital-to-analog converter; and the radio frequency front end performs up-conversion modulation on a signal of the digital-to-analog converter to modulate the signal onto a carrier frequency, and transmits the data by using an antenna. To support a beamforming function, the radio frequency front end of the transmit end generally includes a power divider network (Divider), a phase shifter, and an antenna array. The beamforming unit controls, according to information fed back by the baseband processor, the radio frequency front end to perform a phase shift operation, to implement beamforming. A beamforming principle is:

Adjusting a weight amplitude and a weight phase of each antenna array element signal to guide a radio signal to a specific direction, so as to generate a space-oriented beam. In addition to an antenna array and a phase shifter, the radio frequency front end of the receive end includes a power combiner network. The radio frequency front end of the receive end performs down conversion on the received signal at a carrier frequency to a baseband analog signal. The baseband analog signal is converted to a digital signal by means of analog-to-digital conversion, and the baseband processor extracts the transmitted data by means of operations such as channel estimation and QAM demodulation. A function of the beamforming unit of the receive end is the same as that of the beamforming unit of the transmit end, and both the two beamforming units form beams by controlling phase shift values of the phase shifters.

According to the foregoing beamforming principle, an antenna array including multiple antenna units of the transmit end adjusts a weight amplitude and a weight phase of each array element signal, a beam sent by the transmit end points to a specific direction, and an angle at which the beam points to the direction is referred to as an angle of departure (Angle of Departure, AoD for short). An antenna array including multiple antenna units of the receiver adjusts a weight amplitude and a weight phase of each array element signal, a beam sent by the receiver points to a specific direction, and an angle at which the beam points to the direction is referred to as an angle of arrival (Angle of Arrival, AoA for short). Therefore, a communication link can be established between the transmit end and the receive end provided that the directions to which the beam of the transmit end and the beam of the receive end point to are determined, that is, the angle of departure of the transmit end and the angle of arrival of the receive end are determined, so that beam pairing is implemented between the transmit end and the receive end.

It should be noted that, a communication link can be established between the transmit end and the receive end provided that the angle of departure of the transmit end and the angle of arrival of the receive end are determined, so that beam pairing is implemented between the transmit end and the receive end. In the embodiments of the present invention, an example in which the angle of departure of the transmitter is determined is mainly used for describing a training beam sending method and receiving method in the present invention. Determining the angle of arrival of the receiver is similar to determining the angle of departure of the transmitter in the training beam sending and receiving method. Details are not described in the embodiments of the present invention again. The angle of departure (Angle of Departure, AoD for short) is an angle of departure when a beam leaves a linear antenna array, and the angle of arrival (Angle of Arrival, AoA for short) is an angle of arrival when a beam arrives at a linear antenna array. A base station and a terminal may be transmit ends or may be receive ends. Generally, when the base station is used as a transmit end, the terminal is used as a receive end; when the terminal is used as a transmit end, the base station is used as a receive end. In the embodiments of the present invention, a case in which the base station is used as a transmit end and the terminal is used as a receive end is mainly described. A case in which the terminal is used as a transmit end and the base station is used as a receive end is similar to the case in which the base station is used as a transmit end and the terminal is used as a receive end. Details are not described in the embodiments of the present invention again.

Figure 3:
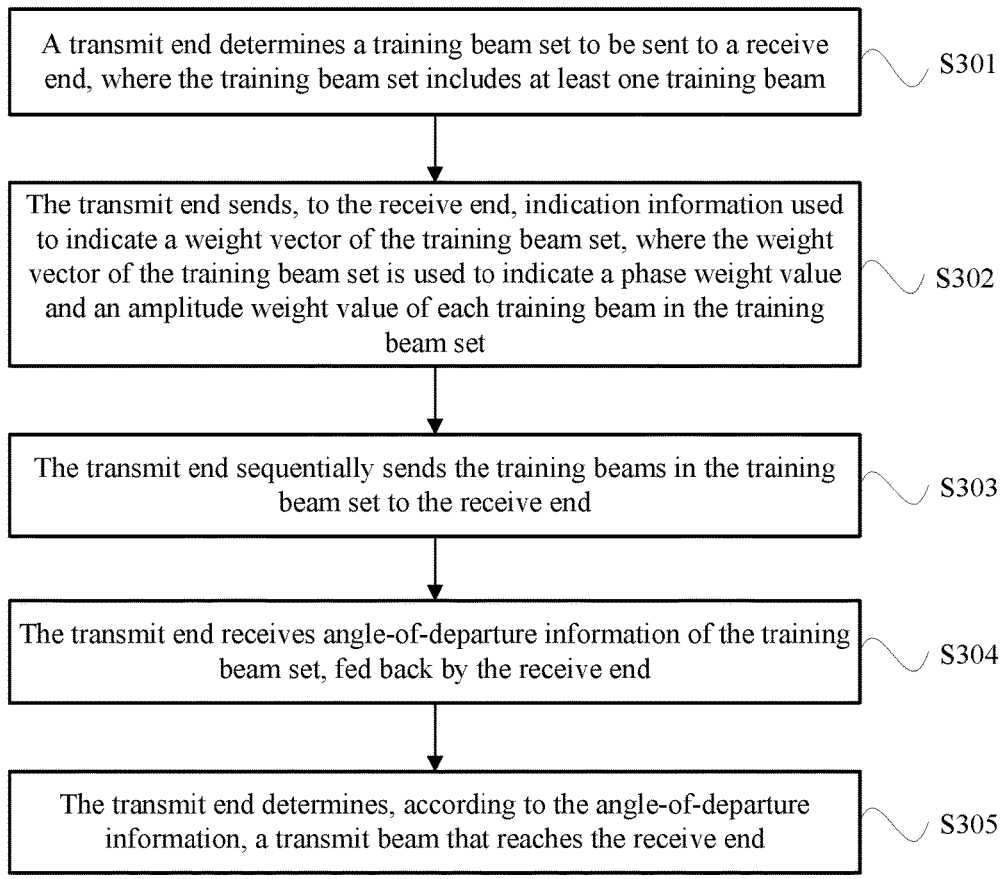
FIG. 3 is a flowchart of a training beam sending method according to a first embodiment of the present invention.

FIG. 3 is a flowchart of a training beam sending method according to a first embodiment of the present invention. As shown in FIG. 3, the method provided in this embodiment of the present invention includes the following steps.

S301. A transmit end determines a training beam set to be sent to a receive end. The training beam set includes at least one training beam.

Specifically, the transmit end determines the training beam set to be sent to the receive end, and starts a beam training mechanism. A compressive sending/compressive sampling (Compressive Sensing/Compressive Sampling, CS for short) framework training mechanism is mainly used in this embodiment of the present invention. However, this is not limited thereto.

S302. The transmit end sends, to the receive end, indication information indicating a combination vector of the training beam set. The combination vector of the training beam set indicates a phase and amplitude weight value of each training beam in the training beam set.

Specifically, the transmit end sends, to the receive end, the indication information that indicates the combination vector of the training beam set, so that the receive end obtains a weight value of each training beam in the training beam set according to the combination vector. The transmit end sends, to the receive end, the indication information that indicates the combination vector of the training beam set, to inform the receive end of the combination vector that is of the training beam set and that needs to be used. Each generated sending training beam corresponds to a unique weight vector, and a value of the weight vector of the training beam determines an amplitude and phase weight value of an antenna unit at a radio frequency front end of the transmit end and at a radio frequency front end of the receive end. A phase and an amplitude of each training beam in the training beam set are respectively determined by a quantity of phase quantization bits and a quantity of amplitude quantization bits. The quantity Q of phase quantization bits and the quantity S of amplitude quantization bits are determined by a hardware capability of the radio frequency front end. A quantity of quantization bits is a quantity of bits of a binary number needed to distinguish between quantitative levels, the quantity of phase quantization bits is a quantity of bits of a binary number required for phase quantization, and the quantity of amplitude quantization bits is a quantity of bits of a binary number required for amplitude quantization.

It should be noted that, overheads required for directly sending the combination vector of the training beam set by the transmit end to the receive end are less than overheads required for directly sending a weight value of the training beam set by the transmit end to the receive end in the prior art. Specifically, it is assumed that the transmit end has $N_t$ transmit antennas, that is, $N_t$ transmit antenna units, a length of a combination vector is $|\Omega|$ and $|\Omega|<N_t$. The overheads required for directly sending a weight value of a single training beam by the transmit end are $N_t \times Q_h$, and the overheads required for directly sending the combination vector of the training beam set by the transmit end are $|\Omega| \times Q_w$. $Q_h$ represents a quantity of bits required for phase and amplitude quantization of the transmit end, $Q_w$ represents a quantity of quantization bits of a combination vector, and generally $Q_w$ is slightly greater than $Q_h$ by several bits. Because $|\Omega|$ is generally far less than $N_t$, the overheads $|\Omega| \times Q_w$ required for directly sending the combination vector of the training beam set by the transmit end to the receive end are less than the overheads $N_t \times Q_h$ required for directly sending a weight value of the training beam set by the transmit end to the receive end. The overheads required for sending a combination vector to the receive end for computing a weight value of a training beam are less than the overheads required for directly sending a generated weight value of the training beam. Therefore, the overheads required for directly sending a combination vector of a training beam set by the transmit end to the receive end are less than the overheads required for directly sending a weight value of the training beam set by the transmit end to the receive end, so that overheads required for sending a training beam are reduced.

S303. The transmit end sequentially sends the training beams in the training beam set to the receive end.

Specifically, after the receive end starts the CS training, the transmit end sends P training beams for training, and the transmit end sends a training sequence to the receive end by using the P training beams.

It should be noted that, when the P sending training beams need to be sent, different combination vectors $\varphi_1, \varphi_2, \ldots, \varphi_P$ of the training beams are separately generated, the transmit end needs to send the combination vectors of the P training beams to the receive end, and then the receive end can compute weight values of the P training beams of the transmit end. Different device manufacturers may use different combination vectors for the transmit end, and therefore, the transmit end needs to send, to the receive end every time, indication information that indicates a combination vector $\varphi$ of a training beam set.

According to the training beam sending method provided in this embodiment of the present invention, the transmit end sends, to the receive end, only the indication information that indicates the combination vector of the training beam set, and the transmit end does not need to send a weight value of the training beam set to the receive end, so that overheads required for sending a training beam are reduced.

Further, in this embodiment of the present invention, optionally, after S303, the method further includes the following steps:

S304. The transmit end receives angle-of-departure information of the training beam set from the receive end.

S305. The transmit end determines, according to the angle-of-departure information, a transmit beam that reaches the receive end.

Specifically, the transmit end adjusts a direction of the transmit beam of the transmit end according to the received angle-of-departure information of the training beam set from the receive end. In this way, a communication link can be established between the transmit end and the receive end, so that beam pairing is implemented between the transmit end and the receive end.

According to the training beam sending method provided in this embodiment of the present invention, the transmit end sends only the combination vector of the training beam set to the receive end, and the transmit end does not need to send a weight value of the training beam set to the receive end, so that overheads required for sending a training beam are reduced. Further, the transmit end receives the angle-of-departure information of the training beam set from the receive end, and the transmit end determines, according to the angle-of-departure information, the transmit beam that reaches the receive end. In this way, a communication link can be established between the transmit end and the receive end, so that beam pairing is implemented between the transmit end and the receive end.

Further, in the foregoing embodiment, the indication information includes the combination vector of the training beam set.

Specifically, in actual application, the receive end may not learn the combination vector, used by the transmit end, of the training beam set. In this case, the transmit end directly sends the combination vector of the training beam set to the receive end, and the receive end receives the combination vector, sent by the transmit end, of the training beam set to obtain the combination vector of the training beam set.

It should be noted that, the indication information includes at least one combination vector of the training beam set, and combination vectors of the training beam set in the indication information are in one-to-one correspondence with training beams in the training beam set. That is, a quantity of the training beams in the training beam set is equal to a quantity of the combination vectors of the training beam set, included in the indication information; or the indication information includes a column quantity of a combination vector set of the training beam set.

Specifically, for all training beams sent by the transmit end, a group of combination vectors may be generated. The group of combination vectors may be referred to as a combination vector set of all the training beams. In actual application, the combination vector set of all the training beams may be prestored in the receiver, that is, the receive end has already learnt the combination vector set of all the training beams. In this case, the transmit end needs to send only a column quantity of the combination vector set of the training beam set to the receive end, that is, the transmit end informs, only by sending the indication information, the receiver of used combination vectors of training beam sets in the combination vector set. According to the combination vector set of the training beams of the receive end and the column quantity, sent by the transmit end, of the combination vector set of the training beam set, the receive end can determine the combination vector that is of the beam set and that needs to be used. For example, it is assumed that a column quantity of a combination vector set of a training beam set in the indication information that is that indicates a combination vector of the training beam set and that is sent by the transmit end to the receive end is 10, and a combination vector set $\phi$, prestored in the receive end, of all training beams has 100 elements, where $$\phi = \begin{bmatrix} \varphi_1 \\ \varphi_2 \\ \vdots \\ \varphi_{99} \\ \varphi_{100} \end{bmatrix}.$$

In this case, the receive end determines, according to the column quantity of the combination vector set of the training beam set in the indication information, ten combination vectors in the combination vector $\phi$ of all the training beams as the combination vector of the training beam set.

It should be noted that, the indication information includes at least one column of combination vectors of a training beam set, and columns of a combination vector of the training beam set in the indication information are in one-to-one correspondence with training beams in the training beam set. That is, a quantity of training beams in the training beam set is equal to a column quantity of the combination vector of the training beam set, included in the indication information.

Further, in the foregoing embodiment, the determining, by a transmit end, a training beam set to be sent to a receive end includes:

determining, by the transmit end, a target area corresponding to a beam that is to be sent to the receive end; and using, by the transmit end, the beam that is in a beam set of the transmit end and that is located in the target area, as the training beam set.

Specifically, the target area is an area in which beam energy is expected to concentrate. In the target area, some columns of a codebook of training beams are marked, and the training beams formed according to training beam weight vectors corresponding to the columns cover a spatial area. The target area may be one sector, an AoD area that needs to be tracked, or multiple AoD areas that need to be tracked. A location of the target area may be determined according to an AoD/AoA direction corresponding to a previous moment, and a size of the target area may be determined according to a channel angular spread, an antenna beamwidth, a moving speed, and the like.

Figure 4:
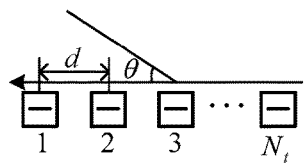
FIG. 4 is a schematic structural diagram of a uniform linear array according to a first embodiment of the present invention.
Figure 5:
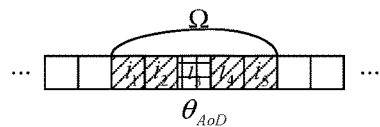
FIG. 5 is a schematic structural diagram of a target area according to a first embodiment of the present invention.

For example, FIG. 4 is a schematic structural diagram of a uniform linear array according to a first embodiment of the present invention. As shown in FIG. 4, the uniform linear array includes $N_t$ antenna units, a distance between every two antenna units is d, and an angle at which a beam leaves an antenna array (an angle of departure) is θ. FIG. 5 is a schematic structural diagram of a target area according to a first embodiment of the present invention. As shown in FIG. 5, beam space is divided into $N_b$ grids by angle θ. $N_b$ represents a quantity of training beams included in a training beam codebook, each grid corresponds to an angle $\theta_i$, and i=1, 2, ..., $N_b$. It is assumed that an angle interval between adjacent grids is $$\frac{\pi}{N_t},$$

a beamwidth is $$\frac{\pi}{N_t},$$

and an area that uses a current angle of departure θ AoD of the transmit end as a center and that has a width of $$\frac{5\pi}{N_t}$$

on both the left and the right is used as a target area Ω. A central location of the target area Ω is the current angle of departure θ AoD of the transmit end. It is assumed that a weight vector of a training beam in the target area corresponds to an $i_3^{th}$ column in a training beam codebook C. Because the beamwidth is $$\frac{\pi}{N_t},$$

if the target area Ω needs to be covered by beams, two grids needs to be occupied on the left of the central location and two grids needs to be occupied on the right of the central location. In this case, identifiers $i_1, i_2, i_3, i_4, i_5$ corresponding to grids in the target area Ω are respectively corresponding to columns $i_1, i_2, i_3, i_4, i_5$ in the training beam codebook C, and the columns $i_1, i_2, i_3, i_4, i_5$ in the training beam codebook C form a training beam codebook set $C_\Omega$.

It should be noted that, the beamwidth refers to an angle between two beam directions in which radiated power decreases by three decibels (dB), on two sides of a maximum radiation direction of a beam. Persons skilled in the art may obtain, with reference to a horizontal angle and a pitch angle or with reference to a pitch angle and an azimuth, a target area corresponding to a planar array and a training beam codebook set that is determined according to the target area. This is not limited and repeated in this embodiment. The target area may be sent by the transmit end to the receive end, or may be pre-stored in the receive end. This is not limited in this embodiment of the present invention.

Further, in the foregoing embodiment, before the determining, by the transmit end, a target area corresponding to a beam that is to be sent to the receive end, the method further includes:

receiving, by the transmit end, notification information sent by the receive end, where the notification information includes information about the target area.

Further, in the foregoing embodiment, before the sequentially sending, by the transmit end, the training beams in the training beam set to the receive end, the method further includes:

sending, by the transmit end to the receive end, information that indicates a codebook set of the training beam in the training beam set, where the codebook set specifies a codebook used by each training beam in the training beam set.

The training beam codebook set $C_\Omega$ is determined by the training beam codebook C and the target area Ω. |Ω| columns of the training beam codebook C form the training beam codebook set $C_\Omega$, and |Ω| is a length of a coverage area of the target area Ω.

It should be noted that, the antenna array of the transmit end may be one of a uniform linear array, a uniform planar array, a circular array, a circular planar array, or the like. Different transmit antenna arrays are corresponding to different training beam codebook sets. The receiver may pre-store multiple training beam codebook sets related to antenna patterns of the transmitter. In this case, provided that the transmitter informs the receiver of information about an antenna pattern of the transmitter, the receiver can determine, according to the information, a training beam set used for computing a weight vector of a training beam.

Specifically, each generated training beam corresponds to a unique weight value, the training beam codebook C includes a generated weight value of each training beam sent by the transmit end, each column of C corresponds to a generated weight value of a training beam, and all columns of C form a training beam codebook set covering whole space or a sector of a base station. It should be noted that, the training beam codebook C may be a discrete Fourier transform (Discrete Fourier Transform, DFT for short) matrix or a part of the DFT matrix, or may be a training beam orientation matrix in which directional vectors of training beams are used as columns.

In some embodiments, the training beam codebook C is an $N_t \times N_t$ discrete Fourier transform DFT matrix, and each column corresponds to a training beam weight vector that is in a specified direction, and
specifically, $$C = \begin{bmatrix} c_{0,0} & c_{0,1} & c_{0,2} & \cdots & c_{0,N_t-1} \\ c_{1,0} & c_{1,1} & c_{1,2} & \cdots & c_{1,N_t-1} \\ c_{2,0} & c_{2,1} & c_{2,2} & \cdots & c_{2,N_t-1} \\ \vdots & \vdots & \vdots & \ddots & \vdots \\ c_{N_t-1,1} & c_{N_t-1,1} & c_{N_t-1,2} & \cdots & c_{N_t-1,N_t-1} \end{bmatrix},$$

where $$c_{m,n} = e^{j \cdot \frac{2\pi \cdot m n}{N_t}},$$

m=0, 1 ..., $N_t$−1, n=0, 1 ..., $N_t$−1, and $N_t$ represents a quantity of antenna units included in a base station.

In some embodiments, the training beam codebook C is an $N_t \times N_t$ training beam orientation matrix, each column of the training beam orientation matrix points to a same direction, and each column corresponds to a training beam weight vector that points to a direction at an angle of $\theta_i$, and
specifically, $C = [c_1\ c_2\ \ldots\ c_{N_b}]$, where $$c_i = \begin{bmatrix} 1 & e^{j \cdot \frac{2\pi \cdot 1 \cdot d}{\lambda_c} \cos(\theta_i)} & \cdots & e^{j \cdot \frac{2\pi \cdot (N_t-1) \cdot d}{\lambda_c} \cos(\theta_i)} \end{bmatrix}^T,$$

a column $c_i$ of c is an $N_t \times 1$ vector, each element of the vector corresponds to a weight value related to an antenna unit in a base station, $0 \le \theta \le \pi$, i=1, 2 ..., $N_t$, $N_b$ represents a quantity of training beams included in the training beam codebook, d represents a distance between two antenna units, and $\lambda_c$ represents a wavelength corresponding to a training beam.

It should be noted that, a training beam codebook corresponding to a uniform linear array is mainly used as an example for description. However, this embodiment of the present invention is not limited only to the training beam codebook corresponding to the uniform linear array. According to an actual scenario requirement, persons skilled in the art easily define a training beam codebook corresponding to another linear array, or obtain a training beam codebook corresponding to a planar array based on the training beam codebook corresponding to the linear array. For example, persons skilled in the art can easily extend the DFT matrix corresponding to the linear array to a planar matrix, or persons skilled in the art can easily define, with reference to a horizontal angle and a pitch angle or with reference to a pitch angle and an azimuth, a training beam codebook corresponding to a planar array. This is not limited and described in this embodiment.

Further, in the foregoing embodiment, before the sequentially sending, by the transmit end, the training beams in the training beam set to the receive end, the method further includes:
sending, by the transmit end, a determined quantization method for the training beam to the receive end, where the quantization method is that indicates phase quantization information and amplitude quantization information of the training beam in the training beam set.

Specifically, the quantization method is determined jointly by the quantity of phase quantization bits, the quantity of amplitude quantization bits, a normalization method, and a quantization function that are supported by the radio frequency front end of the transmit end. The quantization method needs to be sent only once at one transmit end, so that sending overheads can be kept approximately ten bits.

It should be noted that, the quantization method may be sent by the transmit end to the receive end, or may be pre-stored in the receive end. This is not limited in this embodiment of the present invention.

Further, in the foregoing embodiment, before the sequentially sending, by the transmit end, the training beams in the training beam set to the receive end, the method further includes:
generating, by the transmit end, the training beam in the training beam set according to the combination vector of the training beam set, the codebook set of the training beam, and the quantization method.

Further, in this embodiment of the present invention, the generating, by the transmit end, the training beam in the training beam set according to the combination vector of the training beam set, the codebook set of the training beam, and the quantization method includes:
generating, by the transmit end, the training beam in the training beam set by using a formula w=quan($C_\Omega \cdot \varphi$), where
$\varphi$ represents the combination vector of the training beam set, $C_\Omega$ represents the codebook set of the training beam, quan(•) represents the quantization method, and the quantization method is determined jointly by a quantity of phase quantization bits, a quantity of amplitude quantization bits, a normalization method, and a quantization function.

Further, in the foregoing embodiment, the quantization method includes:
determining a phase set $$\left\{ \frac{2\pi s}{2^S} \right\}_{s=1,2,\ldots,2^S}$$

and an amplitude set $$\left\{ \frac{q}{2^Q} \right\}_{q=1,2,\ldots,2^Q}$$

according to the quantity S of phase quantization bits and the quantity Q of amplitude quantization bits;
performing normalization processing on the weight vector w of each training beam; and
quantizing the phase set $$\left\{ \frac{2\pi s}{2^S} \right\}_{s=1,2,\ldots,2^S}$$

and the amplitude set $$\left\{ \frac{q}{2^Q} \right\}_{q=1,2,\ldots,2^Q}.$$

Further, in the foregoing embodiment, each element of the combination vector of the training beam set is obtained by combining an element in a phase set and an element in an amplitude set; and specifically, each element $a_i$ of the combination vector of the training beam set is obtained by means of combination by using a formula $a_i = \alpha_i \cdot e^{j\beta_i}$, where the element in the phase set is $$\beta_i \in \left\{ \frac{2\pi s}{2^S} \right\}_{s=1,2,\ldots,2^S},$$

S represents a quantity of phase quantization bits, the element in the amplitude set is $$\alpha_i \in \left\{ \frac{q}{2^Q} \right\}_{q=1,2,\ldots,2^Q},$$

Q represents a quantity of amplitude quantization bits, $1=1, 2, \ldots, |\Omega|$, and $|\Omega|$ represents a length of a coverage area of the target area.

In this embodiment of the present invention, the combination vector of the training beam set is $\varphi = [a_1 \ a_2 \ \ldots \ a_{|\Omega|}]^T$, and is a $|\Omega| \times 1$ column vector. $|\Omega|$ is the length of the target area $\Omega$, and the length $|\Omega|$ of the combination vector $\varphi$ of the training beam set is the same as a quantity of training beams included in the training beam codebook set $C_\Omega$.

For example, when the quantity of amplitude quantization bits is Q=0, the amplitude set has only one element 1, that is, amplitudes of all elements in the combination vector of the training beam set are the same. In the following example, there is only phase quantization. It is assumed that, $|\Omega|=4$, Q=0, and S=2, that is, there is only phase quantization. In this case, a phase shifter has only four phase states $$0, \frac{\pi}{2}, \pi, \frac{3\pi}{2}.$$

Therefore, the phase set is $$\left\{ 0, \frac{\pi}{2}, \pi, \frac{3\pi}{2} \right\},$$

for example, $$\theta_1 = \pi, \theta_2 = \frac{\pi}{2}, \theta_3 = \frac{3\pi}{2}, \theta_4 = 0;$$

and the corresponding combination vector $\varphi$ of the training beam set is:

$$\varphi = \begin{bmatrix} -1 \\ j \\ -j \\ 1 \end{bmatrix}.$$

Figure 6:
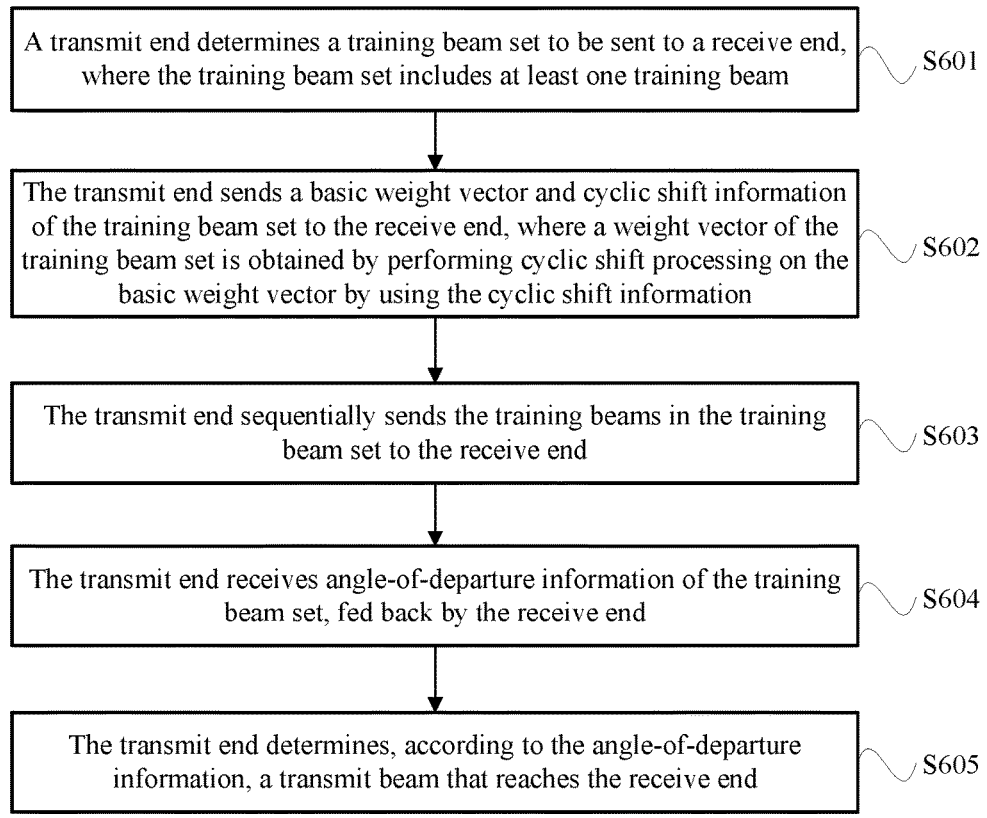
FIG. 6 is a flowchart of a training beam sending method according to a second embodiment of the present invention.

FIG. 6 is a flowchart of a training beam sending method according to a second embodiment of the present invention. As shown in FIG. 6, the method provided in this embodiment of the present invention includes the following steps.

S601. A transmit end determines a training beam set to be sent to a receive end, where the training beam set includes at least one training beam.

S602. The transmit end sends a basic combination vector and cyclic shift information of the training beam set to the receive end, where a combination vector of the training beam set is obtained by performing cyclic shift processing on the basic combination vector by using the cyclic shift information.

The combination vector of the training beam set indicates a phase and amplitude weight value of each training beam in the training beam set.

Specifically, to further reduce overheads required for sending the combination vector of the training beam set by the transmit end, the transmit end may first generate the basic combination vector of the training beam set, and the transmit end sends the basic combination vector and the cyclic shift information of the training beam set to the receive end. Combination vectors of different training beam sets are obtained by performing cyclic shift and by capturing a part of basic combination vectors of training beam sets. It should be noted that, a length of the basic combination vector of the training beam set is greater than a maximum quantity of beams included in a training beam subset, that is, the length of the basic combination vector of the training beam set is greater than a length $|\Omega|$ of a coverage area of a target area.

For example, the transmit end generates a basic combination vector $\varphi_1$ of a training beam set, a length of the basic combination vector is M, a quantity of cyclic shift bits in the cyclic shift information is one bit, and the basic combination vector $\varphi_1$ of the training beam set is $$\varphi_1 = \begin{bmatrix} a_1 \\ a_2 \\ \vdots \\ a_{M-1} \\ a_M \end{bmatrix}, M > |\Omega|.$$

The basic combination vector $\varphi_1$ of the training beam set is shifted one bit upwards in a cyclic manner to obtain $$\varphi' = \begin{bmatrix} a_2 \\ a_3 \\ \vdots \\ a_M \\ a_1 \end{bmatrix},$$

and first $|\Omega|$ elements of $\varphi'$ are captured to form a combination vector of $$\varphi = \begin{bmatrix} a_2 \\ a_3 \\ \vdots \\ a_{|\Omega|-1} \\ a_{|\Omega|} \end{bmatrix}$$

the training beam set.

It should be noted that, the length M of the basic combination vector indicates that the basic combination vector needs $M \cdot Q_w$ bits, where $Q_w$ represents a quantity of quantization bits of the combination vector. The length M of the basic combination vector indicates that only $\log_2(M)$ bits are required for all cyclic shift. If P training beams are used in total, it simply indicates that $P \cdot Q_h \cdot N_t$ bits are required for information about a weight value of a training beam, and approximately $P \cdot Q_w \cdot |\Omega|$ bits are required for directly sending the basic combination vector of the training beam set by the transmit end. If only $P \cdot \log_2(M) + M \cdot Q_w$ bits are required for the basic combination vector and the cyclic shift information that are sent by the transmit end, as a quantity P of training times increases, a $P \cdot \log_2(M)$ portion becomes main overheads. Therefore, in this embodiment, overheads required for sending a basic combination vector and cyclic shift information of a training beam set by the transmit end are less than overheads required for sending a combination vector of a training beam set.

S603. The transmit end sequentially sends the training beams in the training beam set to the receive end.

According to the training beam sending method provided in this embodiment of the present invention, the transmit end sends only the basic combination vector and the cyclic shift information of the training beam set to the receive end, and the transmit end does not need to send a weight value of the training beam set to the receive end, so that overheads required for sending a training beam are greatly reduced.

Further, in this embodiment of the present invention, optionally, after S603, the method further includes the following steps:

S604. The transmit end receives angle-of-departure information of the training beam set from the receive end.

S605. The transmit end determines, according to the angle-of-departure information, a transmit beam that reaches the receive end.

According to the training beam sending method provided in this embodiment of the present invention, the transmit end sends only the basic combination vector and the cyclic shift information of the training beam set to the receive end, and the transmit end does not need to send a weight value of the training beam set to the receive end, so that overheads required for sending a training beam are greatly reduced. Further, the transmit end receives the angle-of-departure information of the training beam set from the receive end, and the transmit end determines, according to the angle-of-departure information, the transmit beam that reaches the receive end. In this way, a communication link can be established between the transmit end and the receive end, so that beam pairing is implemented between the transmit end and the receive end.

Figure 7:
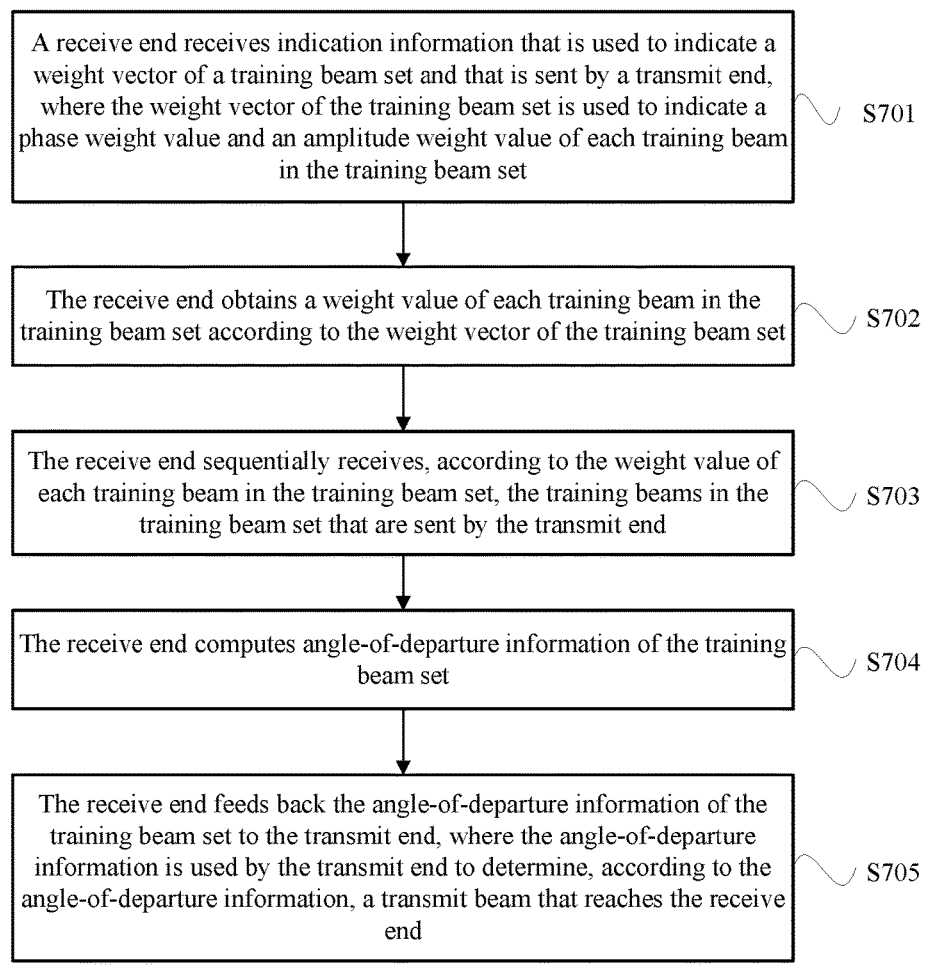
FIG. 7 is a flowchart of a training beam receiving method according to a first embodiment of the present invention.

FIG. 7 is a flowchart of a training beam receiving method according to a first embodiment of the present invention. As shown in FIG. 7, the method provided in this embodiment of the present invention includes the following steps.

S701. A receive end receives indication information that is that indicates a combination vector of a training beam set and that is sent by a transmit end, where the combination vector of the training beam set indicates a phase and amplitude weight value of each training beam in the training beam set.

Specifically, the receive end may determine the combination vector of the training beam set according to the received indication information that is that indicates the combination vector of the training beam set and that is sent by the transmit end.

S702. The receive end obtains a weight value of each training beam in the training beam set according to the combination vector of the training beam set.

In some embodiments, the obtaining, by the receive end, a weight value of each training beam in the training beam set according to the combination vector of the training beam set includes:

computing, by the receive end, the weight vector w of each training beam in the training beam set according to the combination vector of the training beam set by using a formula $w = \text{quan}(C_\Omega \cdot \varphi)$, where $\varphi$ represents the combination vector of the training beam set, $C_\Omega$ represents a codebook set of the training beam, $\text{quan}(\bullet)$ represents a quantization method, and the quantization method is determined jointly by a quantity of phase quantization bits, a quantity of amplitude quantization bits, a normalization method, and a quantization function.

Specifically, the formula $w = \text{quan}(C_\Omega \cdot \varphi)$ may alternatively be $$w = \text{quan}\left(\sum_{i \in \Omega} c_i \cdot \varphi_i\right).$$

That is, the receive end computes the weight value w of each training beam in the training beam set according to the combination vector of the training beam set by using a formula $$w = \text{quan}(C_\Omega \cdot \varphi) = \text{quan}\left(\sum_{i \in \Omega} c_i \cdot \varphi_i\right).$$

$c_i$ represents an element of the training beam codebook C, and $\varphi_i$ represents an element of the combination vector of the training beam set.

It should be noted that, an objective of performing the quantization method $\text{quan}(\bullet)$ is to make the generated weight value w of the training beam satisfy a hardware constraint. The quantization method is determined jointly by the quantity of phase quantization bits, the quantity of amplitude quantization bits, the normalization method, and the quantization function.

S703. The receive end sequentially receives, according to the weight value of each training beam in the training beam set, the training beams in the training beam set that are sent by the transmit end.

According to the training beam receiving method provided in this embodiment of the present invention, the receive end computes, according to the combination vector that is of the training beam set and that is sent by the transmit end, a weight value of the training beam set that is sent by the transmit end to the receive end, and the receive end does not need to directly receive the weight value that is of the training beam set and that is sent by the transmit end, so that overheads required for sending a training beam are reduced.

Further, in this embodiment of the present invention, optionally, after S703, the method further includes the following steps.

S704. The receive end computes angle-of-departure information of the training beam set.

Specifically, the receive end obtains the weight value of each training beam in the training beam set according to the indication information that is that indicates the combination vector of the training beam set and that is sent by the transmit end, and computes the angle-of-departure information of the training beam set. In this embodiment of the present invention, the receive end estimates the angle-ofdeparture information of the beam of the transmit end by using a compressive sensing/compressive sampling (Compressive Sensing/Compressive Sampling, CS for short) framework. When the receive end estimates the angle-of-departure information of the beams of the transmit end, the transmit end needs to transmit a group of training beams for training, and the receive end needs to learn weight vectors corresponding to the training beams sent by the transmit end.

It should be noted that, the receive end can compute the angle-of-departure information of the training beam set only after training of each group of training beam sets is completed.

In some embodiments, the computing, by the receive end, angle-of-departure information of the training beam set includes:

computing, by the receive end, the angle-of-departure information of the training beam set according to the compressive sensing framework.

Specifically, the angle-of-departure information of the training beam set is computed by using the following formula:

$$\min_{h_T \in C^\Omega} \|h_T\|_0$$
$$\text{s.t. } \|y - W_T^T C_\Omega h_T\| \leq \varepsilon,$$

where $h_t$ represents the angle-of-departure information of the training beam set, each non-zero element of $h_T$ corresponds to one angle of departure, y represents information, sent by the transmit end and received by the receive end, about the training beam in the training beam set, $w_T$ represents a matrix including the weight vector w of the training beam, $w_T^T$ represents a transpose of the matrix $w_T$, and s.t. is a constraint condition.

It should be noted that, $w_T$ is an $N_t \times P$ matrix whose column includes weight values of P training beams, and is referred to as a training matrix.

Specifically, the receive end performs receiving by using a receive beam used for receiving a beam weight vector $W_R$. The receive end computes a weight vector w of each training beam in the training beam set according to the combination vector φ of the training beam set, sent by the transmit end. The receive end obtains received measurement information y according to the weight vector $W_R$ of the receive beam of the receive end and the weight vector w, obtained by means of computation, of a transmit beam by using a formula $y = w_R^T H W_T$, where $y = [y_1 \ y_2 \ \ldots \ y_P]^T$, and H represents a channel matrix corresponding to a communication link established between the transmit end and the receive end.

It should be noted that, another computation method may alternatively be used to compute the AoD information of the transmit end according to the CS framework, for example, an iterative threshold algorithm, a matching pursuit algorithm, or a basis pursuit algorithm. This is not limited or repeated in this embodiment of the present invention. Composition and computation principles of the channel matrix corresponding to the communication link established between the transmit end and the receive end are the same as those of a channel matrix corresponding to a communication link established between a transmit end and a receive end in the prior art. This is not described in this embodiment of the present invention again.

It should be noted that, in the prior art, the transmit end directly sends the weight value w of each training beam in the training beam set to the receive end, and the receive end obtains the received measurement information y according to the weight vector $W_R$ of the receive beam of the receive end and the weight value w, directly sent by the transmit end, of the training beam in the training beam set. In the prior art, the transmit end needs to send an $N_t \times P$ matrix to directly send the weight value w of each training beam in the training beam set, and consequently, overheads required for sending a training beam are quite high.

S705. The receive end feeds back the angle-of-departure information of the training beam set to the transmit end, where the angle-of-departure information is used by the transmit end to determine, according to the angle-of-departure information, a transmit beam that reaches the receive end.

According to the training beam receiving method provided in this embodiment of the present invention, the receive end computes, according to the combination vector that is of the training beam set and that is sent by the transmit end, a weight value of the training beam set that is sent by the transmit end to the receive end, and the receive end does not need to directly receive the weight value that is of the training beam set and that is sent by the transmit end, so that overheads required for sending a training beam are reduced. Further, the receive end computes the angle-of-departure information of the training beam set, and the receive end feeds back the angle-of-departure information of the training beam set to the transmit end, so that the transmit end determines, according to the angle-of-departure information, the transmit beam that reaches the receive end. In this way, a communication link can be established between the transmit end and the receive end, so that beam pairing is implemented between the transmit end and the receive end.

Further, in the foregoing embodiment, the indication information includes the combination vector of the training beam set.

Specifically, the transmit end directly sends the combination vector of the training beam set to the receive end, and the receive end receives the combination vector, sent by the transmit end, of the training beam set to obtain the combination vector of the training beam set.

Alternatively, the indication information includes a column quantity of a combination vector set of the training beam set.

Specifically, in actual application, the receive end prestores the combination vectors of all the training beams. In this case, the receive end needs to receive only a column quantity, sent by the transmit end, of the combination vector set of the training beam set. According to the combination vectors, prestored in the receive end, of the training beams and the column quantity, sent by the transmit end, of the combination vector set of the training beam set, the receive end can determine the combination vector that is of the beam set and that needs to be used. For example, it is assumed that a column quantity of a combination vector set of a training beam set in the indication information that is that indicates a combination vector of the training beam set and that is received by the receive end from the transmit end is 10, and the combination vector set φ, prestored in the receive end, of all training beams has 100 elements, where $$\phi = \begin{bmatrix} \varphi_1 \\ \varphi_2 \\ \vdots \\ \varphi_{99} \\ \varphi_{100} \end{bmatrix}.$$

In this case, the receive end determines, according to the column quantity of the combination vector set of the training beam set in the indication information, ten combination vectors in the combination vector φ of all the training beams as the combination vector of the training beam set.

Further, in the foregoing embodiment, before the obtaining, by the receive end, a weight value of each training beam in the training beam set according to the combination vector of the training beam set, the method further includes:

receiving, by the receive end, a determined target area corresponding to a beam and that is sent by the transmit end, where the target area is that indicates the training beam set that the transmit end determines to send to the receive end.

Further, in the foregoing embodiment, after the receiving, by the receive end, a determined target area corresponding to a beam and that is sent by the transmit end, the method further includes:

sending, by the receive end, notification information to the transmit end, where the notification information includes information about the target area.

Further, in the foregoing embodiment, before the obtaining, by the receive end, a weight value of each training beam in the training beam set according to the combination vector of the training beam set, the method further includes:

receiving, by the receive end, information that is that indicates a codebook set of the training beam in the training beam set and that is sent by the transmit end, where the codebook set specifies a codebook used by each training beam in the training beam set.

Further, in the foregoing embodiment, before the obtaining, by the receive end, a weight value of each training beam in the training beam set according to the combination vector of the training beam set, the method further includes:

receiving, by the receive end, a determined quantization method for the training beam, where the quantization method is sent by the transmit end and is that indicates phase quantization information and amplitude quantization information of the training beam in the training beam set.

Further, in the foregoing embodiment, the quantization method includes:

determining a phase set $$\left\{ \frac{2\pi s}{2^S} \right\}_{s=1,2,\ldots,2^S}$$

and an amplitude set $$\left\{ \frac{q}{2^Q} \right\}_{q=1,2,\ldots,2^Q}$$

according to the quantity S of phase quantization bits and the quantity Q of amplitude quantization bits.

Specifically, it can be learnt from the foregoing that the quantity S of amplitude quantization bits and the quantity Q of phase quantization bits are determined by a hardware capability of a radio frequency front end. S is used to determine the phase set $$\left\{ \frac{2\pi \cdot s}{2^S} \right\}_{s=0,1,\ldots,2^S-1},$$

and Q is used to determine the amplitude set $$\left\{ \frac{q}{2^Q} \right\}_{q=1,2,\ldots,2^Q}.$$

Especially when Q=0, it indicates that there is only phase quantization.

Normalization processing is performed on the weight vector w of each training beam.

Specifically, before quantization is performed by using the quantization function, normalization processing needs to be performed on each unquantized training beam weight value $$u = C_\Omega \cdot \varphi = \begin{bmatrix} u_1 e^{j\beta_1} & u_2 e^{j\beta_2} & \ldots & u_{N_t} e^{j\beta_{N_t}} \end{bmatrix}^T,$$

where u≥0, and $\beta_i$ represents a phase obtained after a weight operation is performed. A normalization factor is $$\eta = \frac{1}{\max_{1 \le i \le N_t}\{u_i\}},$$

that is, a reciprocal of a maximum of unquantized weight values of each training beam, and an unquantized and normalized weight value of each training beam is $$u' = \eta u = \begin{bmatrix} \eta u_1 e^{j\beta_1} & \eta u_2 e^{j\beta_2} & \ldots & \eta u_{N_t} e^{j\beta_{N_t}} \end{bmatrix}^T.$$

In the present invention, normalization is performed by using a maximum amplitude in the combination vector. In this way, it is ensured that transmit power of each antenna channel does not reach the maximum value when the radio frequency front end performs transmission at maximum transmit power. It should be noted that, persons skilled in the art may alternatively use another normalization method. This is not limited and described in this embodiment.

The phase set $$\left\{ \frac{2\pi s}{2^S} \right\}_{s=1,2,\ldots,2^S}$$

and the amplitude set $$\left\{ \frac{q}{2^Q} \right\}_{q=1,2,\ldots,2^Q}$$

are quantized.

Specifically, the phase set $$\left\{\frac{2\pi s}{2^S}\right\}_{s=1,2,\ldots,2^S}$$

and the amplitude set $$\left\{\frac{q}{2^Q}\right\}_{q=1,2,\ldots,2^Q}$$

are quantized by using the quantization function. Frequently used quantization functions are ceil, floor, round, and the like. The quantization functions are used to quantize a phase as an element in the phase set $$\left\{\frac{2\pi s}{2^S}\right\}_{s=1,2,\ldots,2^S}$$

and quantize an amplitude as an element in the amplitude set $$\left\{\frac{q}{2^Q}\right\}_{q=1,2,\ldots,2^Q},$$

according to a specific principle. The ceil function is used to quantize a phase $\theta$ as a value that is greater than and closest to (not less than) the phase $\theta$ in the phase set $$\left\{\frac{2\pi s}{2^S}\right\}_{s=1,2,\ldots,2^S}$$

and quantize an amplitude $\alpha$ as a value that is greater than and closest to (not less than) the amplitude $\alpha$ in the amplitude set. The floor function is used to quantize the phase $\theta$ as a value that is less than and closest to (not greater than) the phase $\theta$ in the phase set $$\left\{\frac{2\pi s}{2^S}\right\}_{s=1,2,\ldots,2^S}$$

and quantize the amplitude $\alpha$ as a value that is less than and closest to (not greater than) the amplitude $\alpha$ in the amplitude set $$\left\{\frac{q}{2^Q}\right\}_{q=1,2,\ldots,2^Q}.$$

The round function is used to quantize the phase $\theta$ as a value closest to the phase $\theta$ in the phase set $$\left\{\frac{2\pi s}{2^S}\right\}_{s=1,2,\ldots,2^S}$$

and quantize the amplitude $\alpha$ as a value closest to the amplitude $\alpha$ in the amplitude set $$\left\{\frac{q}{2^Q}\right\}_{q=1,2,\ldots,2^Q}.$$

A same quantization function or different quantization functions may be used for amplitude quantization and phase quantization. Phase quantization is used as an example to describe a difference between output results of three quantization functions. Assuming that S=2, the phase set is $$\left\{0, \frac{\pi}{2}, \pi, \frac{3\pi}{2}\right\}.$$

For example, if $$\theta = \frac{\pi}{4}$$

holds true, the three functions are as follows:

$$\mathrm{ceil}(\theta) = \frac{\pi}{2}, \mathrm{floor}(\theta) = 0, \text{ and } \mathrm{round}(\theta) = \frac{\pi}{2}; \text{ if } \theta = \frac{\pi}{16}$$

holds true, the three functions are as follows:

$$\mathrm{ceil}(\theta) = \frac{\pi}{2}$$

floor($\theta$)=0, and round($\theta$)=0.

Further, in the foregoing embodiment, each element of the combination vector of the training beam set is obtained by combining an element in a phase set and an element in an amplitude set.

Specifically, each element $a_i$ of the combination vector of the training beam set is obtained by means of combination by using a formula $a_i = \alpha_i \cdot e^{j \cdot \beta_i}$, where
the element in the phase set is $$\beta_i \in \left\{\frac{2\pi s}{2^S}\right\}_{s=1,2,\ldots,2^S},$$

S represents a quantity of phase quantization bits, the element in the amplitude set is $$\alpha_i \in \left\{\frac{q}{2^Q}\right\}_{q=1,2,\ldots,2^Q},$$

Q represents a quantity of amplitude quantization bits, i=1, 2 . . . , $|\Omega|$, and $|\Omega|$ represents a length of a coverage area of the target area.

Figure 8:
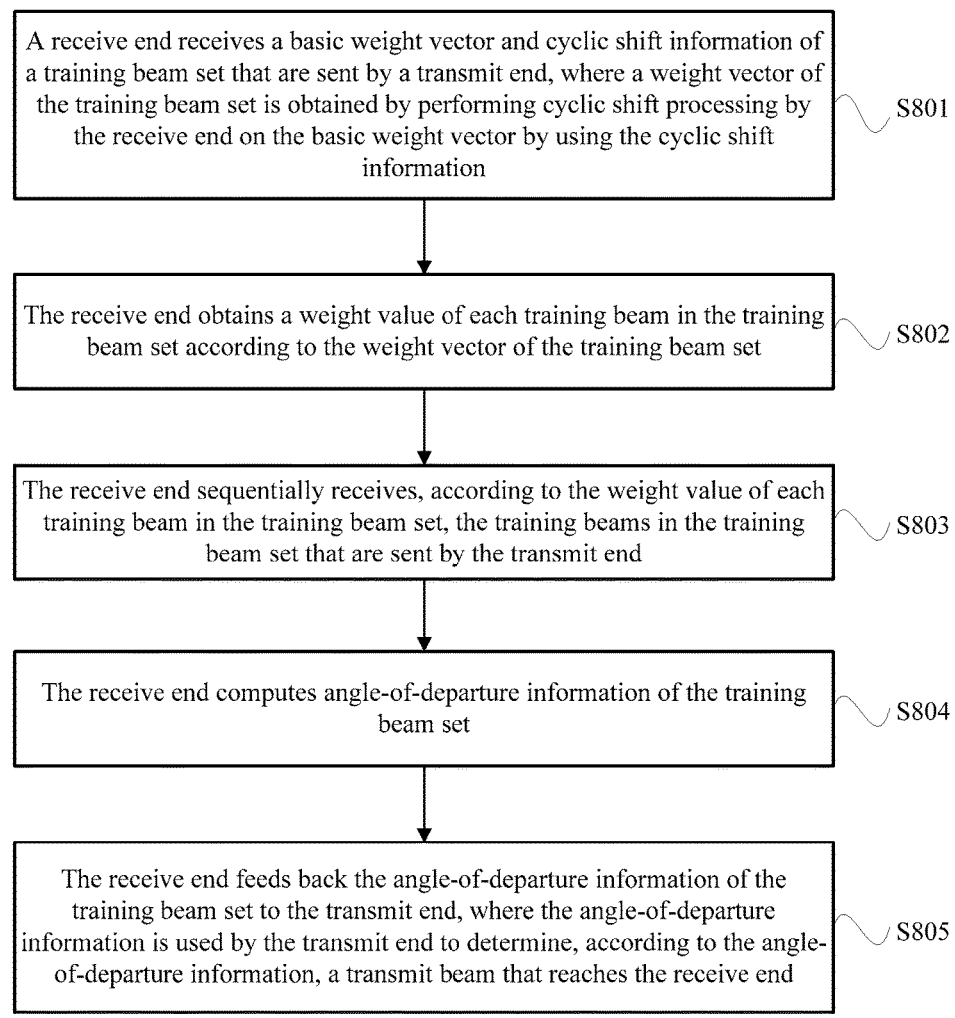
FIG. 8 is a flowchart of a training beam receiving method according to a second embodiment of the present invention.

FIG. 8 is a flowchart of a training beam receiving method according to a second embodiment of the present invention. As shown in FIG. 8, the method provided in this embodiment of the present invention includes the following steps.

S801. A receive end receives a basic combination vector and cyclic shift information of a training beam set that are sent by a transmit end, where a combination vector of the training beam set is obtained by performing cyclic shift processing by the receive end on the basic combination vector by using the cyclic shift information.

The combination vector of the training beam set indicates a phase and amplitude weight value of each training beam in the training beam set.

S802. The receive end obtains a weight value of each training beam in the training beam set according to the combination vector of the training beam set.

S803. The receive end sequentially receives, according to the weight value of each training beam in the training beam set, the training beams in the training beam set that are sent by the transmit end.

According to the training beam receiving method provided in this embodiment of the present invention, the receive end computes, according to the basic combination vector and the cyclic shift information that are of the training beam set and that are sent by the transmit end, a weight value of the training beam set that is sent by the transmit end to the receive end, and the receive end does not need to directly receive the weight value that is of the training beam set and that is sent by the transmit end, so that overheads required for sending a training beam are greatly reduced.

Further, in this embodiment of the present invention, optionally, after S803, the method further includes the following steps.

S804. The receive end computes angle-of-departure information of the training beam set.

Specifically, the receive end obtains the weight value of each training beam in the training beam set according to indication information that is that indicates the combination vector of the training beam set and that is sent by the transmit end, and computes the angle-of-departure information of the training beam set.

S805. The receive end feeds back the angle-of-departure information of the training beam set to the transmit end, where the angle-of-departure information is used by the transmit end to determine, according to the angle-of-departure information, a transmit beam that reaches the receive end.

According to the training beam receiving method provided in this embodiment of the present invention, the receive end computes, according to the basic combination vector and the cyclic shift information that are of the training beam set and that are sent by the transmit end, a weight value of the training beam set that is sent by the transmit end to the receive end, and the receive end does not need to directly receive the weight value that is of the training beam set and that is sent by the transmit end, so that overheads required for sending a training beam are greatly reduced. Further, the receive end computes the angle-of-departure information of the training beam set, and the receive end feeds back the angle-of-departure information of the training beam set to the transmit end, so that the transmit end determines, according to the angle-of-departure information, the transmit beam that reaches the receive end. In this way, a communication link can be established between the transmit end and the receive end, so that beam pairing is implemented between the transmit end and the receive end.

Figure 9:
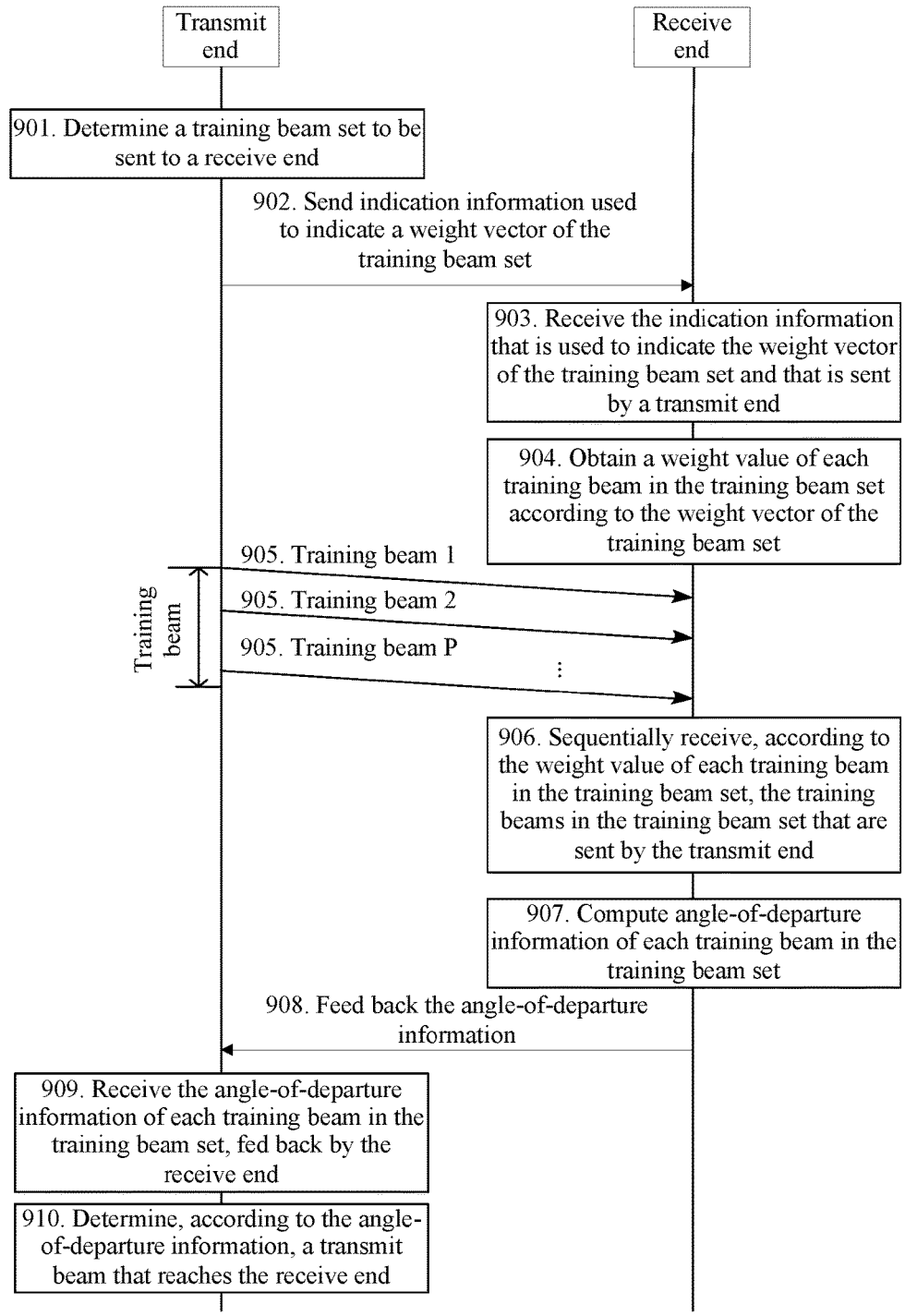
FIG. 9 is a flowchart of a training beam transmission method according to a first embodiment of the present invention.

FIG. 9 is a flowchart of a training beam transmission method according to a first embodiment of the present invention. As shown in FIG. 9, the method provided in this embodiment of the present invention includes the following steps.

S901. A transmit end determines a training beam set to be sent to a receive end, where the training beam set includes at least one training beam.

S902. The transmit end sends, to the receive end, indication information indicating a combination vector of the training beam set, where the combination vector of the training beam set indicates a phase and amplitude weight value of each training beam in the training beam set.

S903. The receive end receives the indication information that is that indicates the combination vector of the training beam set and that is sent by the transmit end, where the combination vector of the training beam set indicates the phase and amplitude weight value of each training beam in the training beam set.

S904. The receive end obtains a weight value of each training beam in the training beam set according to the combination vector of the training beam set.

S905. The transmit end sequentially sends the training beams in the training beam set to the receive end.

S906. The receive end sequentially receives, according to the weight value of each training beam in the training beam set, the training beams in the training beam set that are sent by the transmit end.

According to the training beam transmission method provided in this embodiment of the present invention, the transmit end sends only the combination vector of the training beam set to the receive end, and the transmit end does not need to send a weight value of the training beam set to the receive end; and the receive end computes, according to the combination vector that is of the training beam set and that is sent by the transmit end, the weight value of the training beam set that is sent by the transmit end to the receive end, and the receive end does not need to directly receive the weight value that is of the training beam set and that is sent by the transmit end, so that overheads required for sending a training beam are reduced.

Further, in this embodiment of the present invention, optionally, after S906, the method further includes the following steps:

S907. The receive end computes angle-of-departure information of the training beam set.

Specifically, the receive end obtains the weight value of each training beam in the training beam set according to the indication information that is that indicates the combination vector of the training beam set and that is sent by the transmit end, and computes the angle-of-departure information of the training beam set.

S908. The receive end feeds back the angle-of-departure information of the training beam set to the transmit end, where the angle-of-departure information is used by the transmit end to determine, according to the angle-of-departure information, a transmit beam that reaches the receive end.

S909. The transmit end receives the angle-of-departure information of the training beam set from the receive end.

S910. The transmit end determines, according to the angle-of-departure information, the transmit beam that reaches the receive end.

According to the training beam transmission method provided in this embodiment of the present invention, the transmit end sends only the combination vector of the training beam set to the receive end, and the transmit end does not need to send a weight value of the training beam set to the receive end; and the receive end computes, according to the combination vector that is of the training beam set and that is sent by the transmit end, the weight value of the training beam set that is sent by the transmit end to the receive end, and the receive end does not need to directly receive the weight value that is of the training beam set and that is sent by the transmit end, so that overheads required for sending a training beam are reduced. Further, the receive end computes the angle-of-departure information of the training beam set, and the receive end feeds back the angle-of-departure information of the training beam set to the transmit end, so that the transmit end determines, according to the angle-of-departure information, the transmit beam that reaches the receive end. The transmit end receives the angle-of-departure information of the training beam set from the receive end, and the transmit end determines, according to the angle-of-departure information, the transmit beam that reaches the receive end. In this way, a communication link can be established between the transmit end and the receive end, so that beam pairing is implemented between the transmit end and the receive end.

Figure 10:
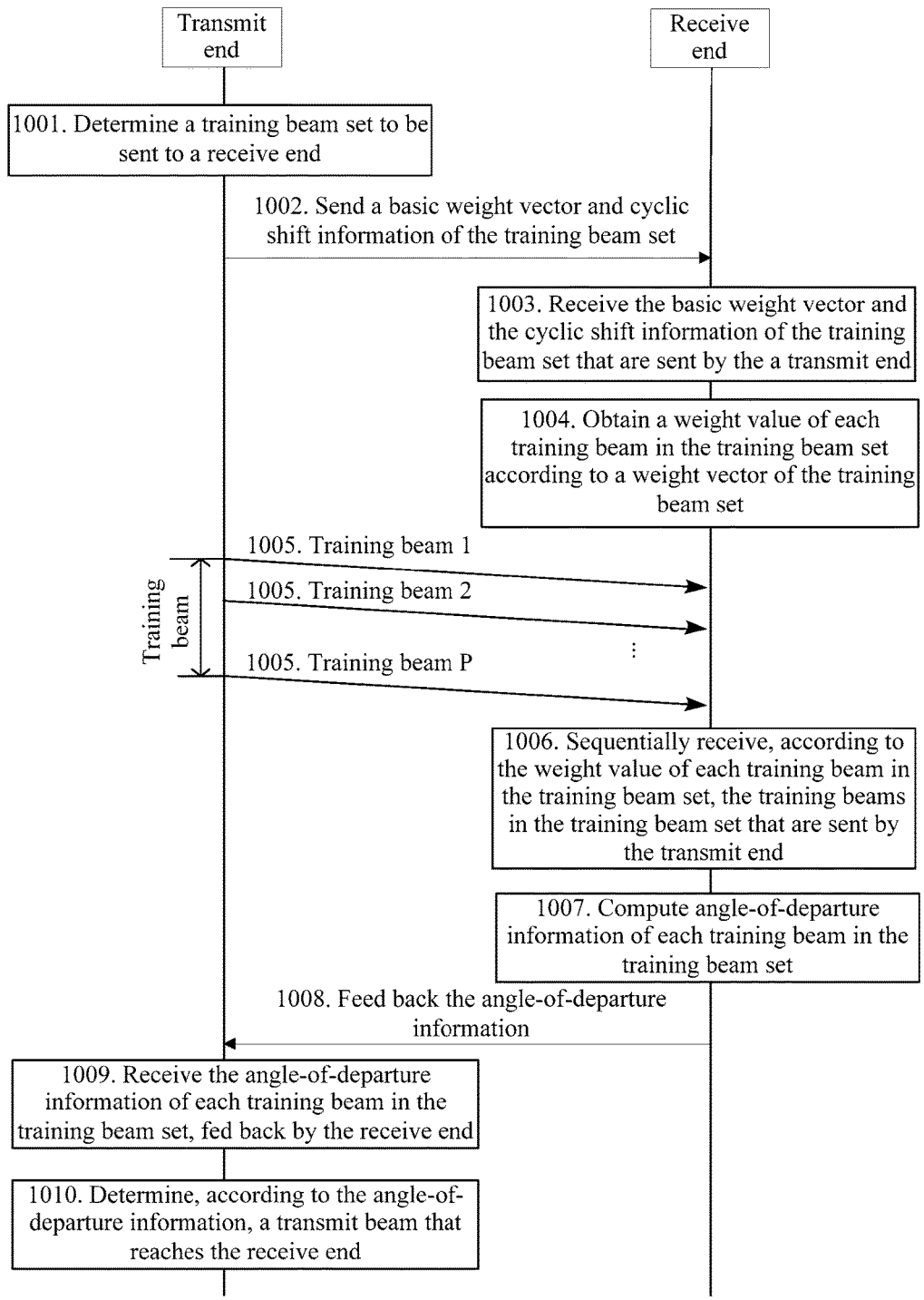
FIG. 10 is a flowchart of a training beam transmission method according to a second embodiment of the present invention.

FIG. 10 is a flowchart of a training beam transmission method according to a second embodiment of the present invention. As shown in FIG. 10, the method provided in this embodiment of the present invention includes the following steps.

S1001. A transmit end determines a training beam set to be sent to a receive end, where the training beam set includes at least one training beam.

S1002. The transmit end sends a basic combination vector and cyclic shift information of the training beam set to the receive end, where a combination vector of the training beam set is obtained by performing cyclic shift processing on the basic combination vector by using the cyclic shift information.

S1003. The receive end receives the basic combination vector and the cyclic shift information of the training beam set that are sent by the transmit end, where the combination vector of the training beam set is obtained by performing cyclic shift processing by the receive end on the basic combination vector by using the cyclic shift information.

S1004. The receive end obtains a weight value of each training beam in the training beam set according to the combination vector of the training beam set.

S1005. The transmit end sequentially sends the training beams in the training beam set to the receive end.

S1006. The receive end sequentially receives, according to the weight value of each training beam in the training beam set, the training beams in the training beam set that are sent by the transmit end.

According to the training beam transmission method provided in this embodiment of the present invention, the transmit end sends only the basic combination vector and the cyclic shift information of the training beam set to the receive end, and the transmit end does not need to send a weight value of the training beam set to the receive end; and the receive end computes, according to the basic combination vector and the cyclic shift information that are of the training beam set and that are sent by the transmit end, the weight value of the training beam set that is sent by the transmit end to the receive end, and the receive end does not need to directly receive the weight value that is of the training beam set and that is sent by the transmit end, so that overheads required for sending a training beam are greatly reduced.

Further, in this embodiment of the present invention, optionally, after S1006, the method further includes the following steps:

S1007. The receive end computes angle-of-departure information of the training beam set.

Specifically, the receive end obtains the weight value of each training beam in the training beam set according to indication information that is that indicates the combination vector of the training beam set and that is sent by the transmit end, and computes the angle-of-departure information of the training beam set.

S1008. The receive end feeds back the angle-of-departure information of the training beam set to the transmit end, where the angle-of-departure information is used by the transmit end to determine, according to the angle-of-departure information, a transmit beam that reaches the receive end.

S1009. The transmit end receives the angle-of-departure information of the training beam set from the receive end.

S1010. The transmit end determines, according to the angle-of-departure information, the transmit beam that reaches the receive end.

According to the training beam transmission method provided in this embodiment of the present invention, the transmit end sends only the basic combination vector and the cyclic shift information of the training beam set to the receive end, and the transmit end does not need to send a weight value of the training beam set to the receive end; and the receive end computes, according to the basic combination vector and the cyclic shift information that are of the training beam set and that are sent by the transmit end, the weight value of the training beam set that is sent by the transmit end to the receive end, and the receive end does not need to directly receive the weight value that is of the training beam set and that is sent by the transmit end, so that overheads required for sending a training beam are greatly reduced. Further, the receive end computes the angle-of-departure information of the training beam set, and the receive end feeds back the angle-of-departure information of the training beam set to the transmit end, so that the transmit end determines, according to the angle-of-departure information, the transmit beam that reaches the receive end. The transmit end receives the angle-of-departure information of the training beam set from the receive end, and the transmit end determines, according to the angle-of-departure information, the transmit beam that reaches the receive end. In this way, a communication link can be established between the transmit end and the receive end, so that beam pairing is implemented between the transmit end and the receive end.

Figure 11:
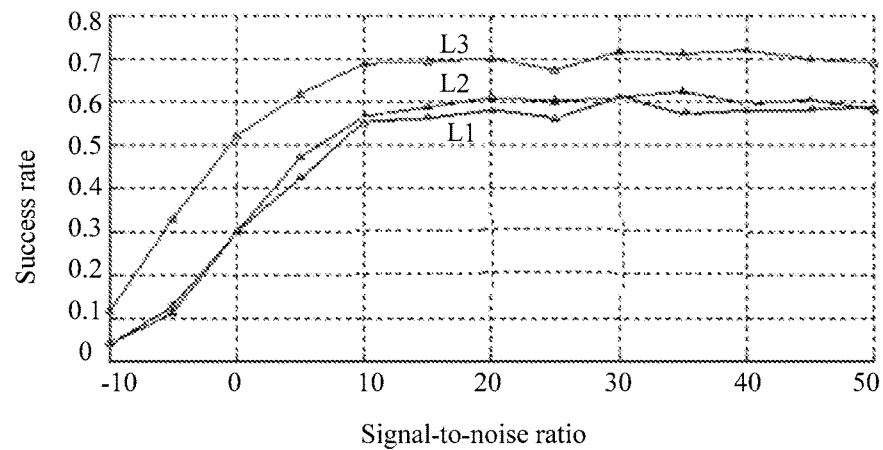
FIG. 11 is a schematic diagram of an emulation result of a training beam transmission method according to an embodiment of the present invention.

FIG. 11 is a schematic diagram of an emulation result of a training beam transmission method according to an embodiment of the present invention. As shown in FIG. 11, in the figure, L1 represents a schematic emulation diagram of a training beam generated by using a random combination vector $\{-1, 1, -j, j\}$; L2 represents a schematic emulation diagram of a training beam generated by using two phase quantization bits; and L3 represents an emulation result diagram obtained by using the training beam transmission method provided in the embodiments of the present invention. With reference to the foregoing embodiments, the present invention provides a low-overheads transmission method for a training beam generated by estimating an AoD of a transmitter by using a CS framework. According to the present invention, a weight value of a training beam is generated by using a weight vector of the training beam, and the training beam that is formed according to the generated weight value of the training beam may be used to focus energy on a target area, so as to improve a signal-to-noise ratio (Signal-to-Noise Ratio, SNR for short) of a receive end. As shown in FIG. 11, in the emulation result diagram obtained by using the training beam transmission method provided in the embodiments of the present invention, a received signal-to-noise ratio decreases by approximately 10 dB in L3 compared with that in L2, and an estimation success rate increases from 60% to 70%. It should be noted that, the emulation result in FIG. 11 is obtained by means of emulation on the premise that a transmit end uses an 8×8 antenna array, the receive end uses a 4×4 antenna array, and 64 training beams are used.

Figure 12:
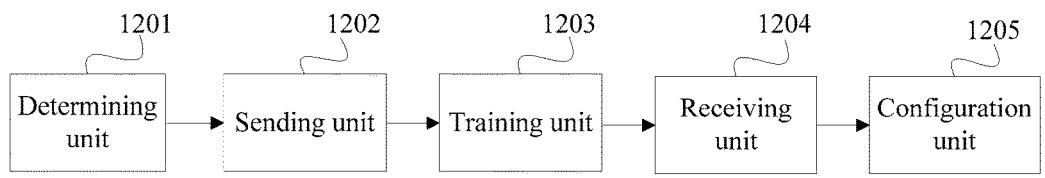
FIG. 12 is a schematic structural diagram of a base station according to a first embodiment of the present invention.

FIG. 12 is a schematic structural diagram of a base station according to a first embodiment of the present invention. As shown in FIG. 12, the base station provided in this embodiment of the present invention includes:

a determining unit 1201, configured for the base station to determine a training beam set to be sent to a terminal, where the training beam set includes at least one training beam;

a sending unit 1202, configured for the base station to send, to the terminal, indication information indicating a combination vector of the training beam set, where the combination vector of the training beam set indicates a phase and amplitude weight value of each training beam in the training beam set; and a training unit 1203, configured for the base station to sequentially send the training beams in the training beam set to the terminal.

Further, in this embodiment of the present invention, optionally, the base station further includes:

a receiving unit 1204, configured for the base station to receive angle-of-departure information of the training beam set, fed back by the terminal; and a configuration unit 1205, configured for the base station to determine, according to the angle-of-departure information, a transmit beam that reaches the terminal.

The base station in this embodiment is configured to implement the technical solution of the method embodiment shown in FIG. 3. An implementation principle and a technical effect of the base station are similar to those in the method embodiment, and details are not described herein again.

Further, in the foregoing embodiment, the sending unit 1202 is further configured for the base station to:

send the combination vector of the training beam set to the terminal; or send a column quantity of a combination vector set of the training beam set to the terminal.

Further, in the foregoing embodiment, the determining unit 1201 is further configured for the base station to:

determine a target area corresponding to a beam that is to be sent to the terminal; and use the beam that is in a beam set of the base station and that is located in the target area, as the training beam set.

Further, in the foregoing embodiment, the determining unit 1201 is further configured for the base station to:

send notification information sent by the terminal, where the notification information includes information about the target area.

Further, in the foregoing embodiment, the sending unit 1202 is further configured for the base station to:

send a basic combination vector and cyclic shift information of the training beam set to the terminal, where the combination vector of the training beam set is obtained by performing cyclic shift processing on the basic combination vector by using the cyclic shift information.

Further, in the foregoing embodiment, the sending unit 1202 is further configured for the base station to:

send, to the terminal, information that indicates a codebook set of the training beam in the training beam set, where the codebook set specifies a codebook used by each training beam in the training beam set.

Further, in the foregoing embodiment, the sending unit 1202 is further configured for the base station to:

send a determined quantization method for the training beam to the terminal, where the quantization method is that indicates phase quantization information and amplitude quantization information of the training beam in the training beam set.

Further, in the foregoing embodiment, the training unit 1203 is further configured for the base station to:

generate the training beam in the training beam set according to the combination vector of the training beam set, the codebook set of the training beam, and the quantization method.

Further, in the foregoing embodiment, the training unit 1203 is further configured for the base station to:

generate the training beam in the training beam set by using a formula w=quan($C_\Omega \cdot \varphi$), where $\varphi$ represents the combination vector of the training beam set, $C_\Omega$ represents the codebook set of the training beam, quan($\Omega$) represents the quantization method, and the quantization method is determined jointly by a quantity of phase quantization bits, a quantity of amplitude quantization bits, a normalization method, and a quantization function.

Further, in the foregoing embodiment, the training unit 1203 is further configured to:

determine a phase set $$\left\{\frac{2\pi s}{2^S}\right\}_{s=1,2,\ldots,2^S}$$

and an amplitude set $$\left\{\frac{q}{2^Q}\right\}_{q=1,2,\ldots,2^Q}$$

according to the quantity S of phase quantization bits and the quantity Q of amplitude quantization bits;

perform normalization processing on a weight vector w of each training beam; and quantize the phase set $$\left\{\frac{2\pi s}{2^S}\right\}_{s=1,2,\ldots,2^S}$$

and the amplitude set $$\left\{\frac{q}{2^Q}\right\}_{q=1,2,\ldots,2^Q}.$$

Further, in the foregoing embodiment, the determining unit 1201 is further configured to:

each element of the combination vector of the training beam set is obtained by combining an element in a phase set and an element in an amplitude set; and specifically, each element $a_i$ of the combination vector of the training beam set is obtained by means of combination by using a formula $a_i = \alpha_i \cdot e^{j \cdot \beta_i}$, where the element in the phase set is $$\beta_i \in \left\{\frac{2\pi s}{2^S}\right\}_{s=1,2,\ldots,2^S},$$

S represents a quantity of phase quantization bits, the element in the amplitude set is $$\alpha_i \in \left\{ \frac{q}{2^Q} \right\}_{q=1,2,\ldots,2^Q},$$

Q represents a quantity of amplitude quantization bits, i=1, 2 ..., |Ω|, and |Ω| represents a length of a coverage area of the target area.

Figure 13:
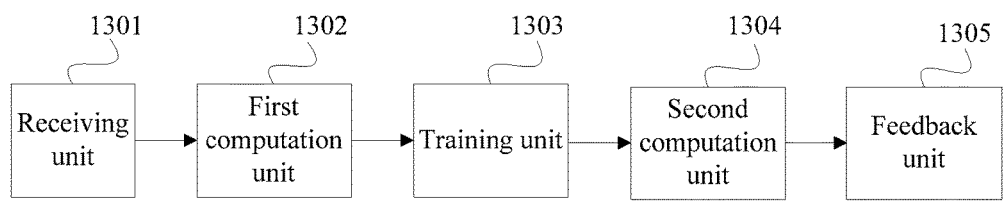
FIG. 13 is a schematic structural diagram of a terminal according to a first embodiment of the present invention.

FIG. 13 is a schematic structural diagram of a terminal according to a first embodiment of the present invention. As shown in FIG. 13, the terminal provided in this embodiment of the present invention includes:

a receiving unit 1301, configured to receive indication information that is that indicates a combination vector of a training beam set and that is sent by a base station, where the combination vector of the training beam set indicates a phase and amplitude weight value of each training beam in the training beam set;

a first computation unit 1302, configured to obtain a weight value of each training beam in the training beam set according to the combination vector of the training beam set; and a training unit 1303, configured to sequentially receive, according to the weight value of each training beam in the training beam set, the training beams in the training beam set that are sent by the base station.

Further, in this embodiment of the present invention, optionally, the base station further includes:

a second computation unit 1304, configured to compute angle-of-departure information of the training beam set; and a feedback unit 1305, configured to feed back the angle-of-departure information of the training beam set to the base station, where the angle-of-departure information is used by the base station to determine, according to the angle-of-departure information, a transmit beam that reaches the terminal.

The base station in this embodiment is configured to implement the technical solution of the method embodiment shown in FIG. 7. An implementation principle and a technical effect of the base station are similar to those in the method embodiment, and details are not described herein again.

Further, in the foregoing embodiment, the receiving unit 1301 is specifically configured to:

receive the combination vector of the training beam set, sent by the base station; or receive a column quantity of a combination vector set of the training beam set, sent by the base station.

Further, in the foregoing embodiment, the receiving unit 1301 is further configured to:

receive a determined target area corresponding to a beam and that is sent by the base station, where the target area is that indicates the training beam set that the base station determines to send to the terminal.

Further, in the foregoing embodiment, the feedback unit 1305 is further configured to:

send notification information to the base station, where the notification information includes information about the target area.

Further, in the foregoing embodiment, the receiving unit 1301 is specifically configured to:

receive a basic combination vector and cyclic shift information of the training beam set that are sent by the base station; and perform cyclic shift processing on the basic combination vector by using the cyclic shift information, to obtain the combination vector of the training beam set.

Further, in the foregoing embodiment, the receiving unit 1301 is further configured to:

receive information that is that indicates a codebook set of the training beam in the training beam set and that is sent by the base station, where the codebook set specifies a codebook used by each training beam in the training beam set.

Further, in the foregoing embodiment, the receiving unit 1301 is further configured to:

receive a determined quantization method for the training beam, where the quantization method is sent by the base station and is that indicates phase quantization information and amplitude quantization information of the training beam in the training beam set.

Further, in the foregoing embodiment, the first computation unit 1302 is specifically configured to:

compute the weight vector w of each training beam in the training beam set according to the combination vector of the training beam set by using a formula $q=\text{quan}(C_\Omega \cdot \varphi)$, where $\varphi$ represents the combination vector of the training beam set, $C_\Omega$ represents the codebook set of the training beam, quan(•) represents the quantization method, and the quantization method is determined jointly by a quantity of phase quantization bits, a quantity of amplitude quantization bits, a normalization method, and a quantization function.

Further, in the foregoing embodiment, the first computation unit 1302 is further configured to:

determine a phase set $$\left\{ \frac{2\pi s}{2^S} \right\}_{s=1,2,\ldots,2^S}$$

and an amplitude set $$\left\{ \frac{q}{2^Q} \right\}_{q=1,2,\ldots,2^Q}$$

according to the quantity S of phase quantization bits and the quantity Q of amplitude quantization bits;

perform normalization processing on the weight vector w of each training beam; and quantize the phase set $$\left\{ \frac{2\pi s}{2^S} \right\}_{s=1,2,\ldots,2^S}$$

and the amplitude set $$\left\{ \frac{q}{2^Q} \right\}_{q=1,2,\ldots,2^Q}.$$

Further, in the foregoing embodiment, the second computation unit 1304 is specifically configured to:

compute the angle-of-departure information of the training beam set according to a compressive sensing framework; and specifically, compute the angle-of-departure information of the training beam set by using the following formula:

$$\min_{h_T \in C^\Omega} \|h_T\|_0$$

$$\text{s.t. } \|y - W_T^T C_\Omega h_T\| \le \varepsilon,$$

where $h_T$ represents the angle-of-departure information of the training beam set, each non-zero element of $h_T$ corresponds to one angle of departure, y represents information, sent by the base station and received by the terminal, about the training beam in the training beam set, $w_T$ represents a matrix including the weight vector w of the training beam, and $w_T^T$ represents a transpose of the matrix $w_T$.

Further, in the foregoing embodiment, the first computation unit 1302 is further configured to:

each element of the combination vector of the training beam set is obtained by combining an element in a phase set and an element in an amplitude set; and specifically, each element $a_i$ of the combination vector of the training beam set is obtained by means of combination by using a formula $a_i = \alpha_i \cdot e^{j \cdot \beta_i}$, where the element in the phase set is $$\beta_i \in \left\{ \frac{2\pi s}{2^S} \right\}_{s=1,2,\ldots,2^S},$$

S represents a quantity of phase quantization bits, the element in the amplitude set is $$\alpha_i \in \left\{ \frac{q}{2^Q} \right\}_{q=1,2,\ldots,2^Q},$$

Q represents a quantity of amplitude quantization bits, i=1, 2 ..., $|\Omega|$, and $|\Omega|$ represents a length of a coverage area of the target area.

Figure 14:
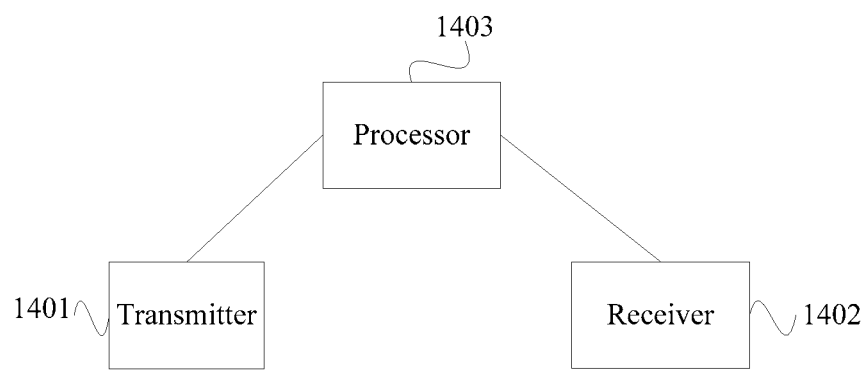
FIG. 14 is a schematic structural diagram of a base station according to a second embodiment of the present invention.

FIG. 14 is a schematic structural diagram of a base station according to a second embodiment of the present invention. As shown in FIG. 14, the base station provided in this embodiment of the present invention includes a transmitter 1401, a receiver 1402, and a processor 1403.

It should be noted that, the transmitter 1401 in this embodiment of the present invention may be corresponding to the sending unit 1202 of the base station. The receiver 1402 may be corresponding to the receiving unit 1204 of the base station. The processor 1403 may be a central processing unit (Central Processing Unit, CPU), an application-specific integrated circuit (Application Specific Integrated Circuit, ASIC), or one or more integrated circuits configured to implement this embodiment of the present invention. The processor 1403 corresponds to a determining unit 1201, a training unit 1203, and a configuration unit 1205, and may control the determining unit 1201, the training unit 1203, and the configuration unit 1205 to perform corresponding operations. The base station may further include a memory. The memory is configured to store instruction code. The processor 1403 invokes the instruction code from the memory, to control the transmitter 1401 and the receiver 1402 in this embodiment of the present invention to perform the foregoing operations.

Figure 15:
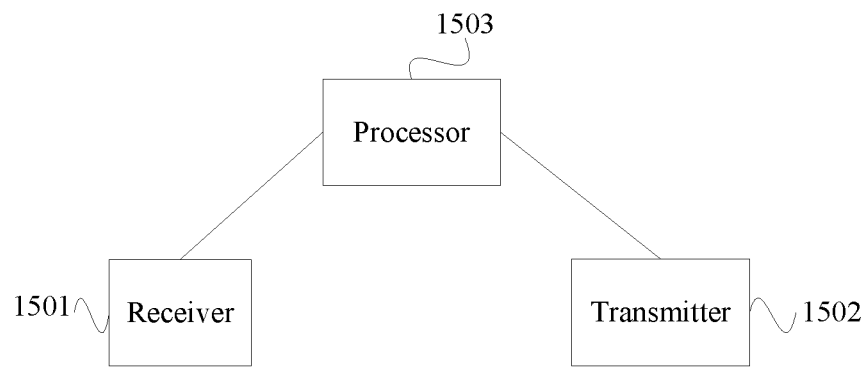
FIG. 15 is a schematic structural diagram of a terminal according to a second embodiment of the present invention.

FIG. 15 is a schematic structural diagram of a terminal according to a second embodiment of the present invention. As shown in FIG. 15, the terminal provided in this embodiment of the present invention includes a receiver 1501, a transmitter 1502, and a processor 1503.

It should be noted that, the receiver 1501 in this embodiment of the present invention may be corresponding to the receiving unit 1301 of the terminal. The transmitter 1502 may be corresponding to the feedback unit 1305 of the terminal. The processor 1503 may be a central processing unit (Central Processing Unit, CPU), an application-specific integrated circuit (Application Specific Integrated Circuit, ASIC), or one or more integrated circuits configured to implement this embodiment of the present invention. The processor 1503 corresponds to a first computation unit 1302, a training unit 1303, and a second computation unit 1304, and may control the first computation unit 1032, the training unit 1303, and the second computation unit 1304 to perform corresponding operations. The terminal may further include a memory. The memory is configured to store instruction code. The processor 1503 invokes the instruction code from the memory, to control the receiver 1501 and the transmitter 1502 in this embodiment of the present invention to perform the foregoing operations.

A beam transmission system provided in an embodiment of the present invention includes the base station in any one of the foregoing embodiments and the terminal in any one of the foregoing embodiments.

It should be noted that, the base station and the terminal may be used as transmit ends or receive ends. This is not limited in this embodiment of the present invention. For the base station and the terminal in this embodiment, reference may be made to related content disclosed by related embodiments related to the base station and the terminal in the foregoing embodiments. An implementation principle and a technical effect in this embodiment are similar to those in the foregoing embodiments related to the base station and the terminal, and details are not described herein again.

According to the training beam transmission method, the apparatus, and the system that are provided in the embodiments of the present invention, the transmit end sends only the combination vector of the training beam set to the receive end, so that the receive end obtains the weight value of each training beam in the training beam set according to the combination vector, and the transmit end does not need to send a weight value of the training beam set to the receive end; and the receive end computes, according to the combination vector that is of the training beam set and that is sent by the transmit end, the weight value of the training beam set that is sent by the transmit end to the receive end, and the receive end does not need to directly receive the weight value that is of the training beam set and that is sent by the transmit end, so that overheads required for sending a training beam are reduced. Further, the receive end computes the angle-of-departure information of the training beam set according to the combination vector sent by the transmit end, and the receive end feeds back the angle-of-departure information of the training beam set to the transmit end, so that the transmit end determines, according to the angle-of-departure information, the transmit beam that reaches the receive end. The transmit end receives the angle-of-departure information of the training beam set from the receive end, and the transmit end determines, according to the angle-of-departure information, the transmit beam that reaches the receive end. In this way, a communication link can be established between the transmit end and the receive end, so that beam pairing is implemented between the transmit end and the receive end.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A training beam sending method, comprising:
    determining, by a transmit end, a training beam set to be sent to a receive end, wherein the training beam set comprises at least one training beam;
    sending, by the transmit end to the receive end, indication information indicating a combination vector of the training beam set, wherein the combination vector of the training beam set indicates a phase and amplitude weight value of each training beam in the training beam set; and
    sequentially sending, by the transmit end, the training beams in the training beam set to the receive end.

2. The method according to claim 1, after the sequentially sending, by the transmit end, the training beams in the training beam set to the receive end, further comprising:
    receiving, by the transmit end, angle-of-departure information of the training beam set from the receive end; and
    determining, by the transmit end according to the angle-of-departure information, a transmit beam that reaches the receive end.

3. The method according to claim 1, wherein the indication information comprises at least one of:
    the combination vector of the training beam set; and
    a column quantity of a combination vector set of the training beam set.

4. The method according to claim 1, wherein the determining, by a transmit end, a training beam set to be sent to a receive end comprises:
    determining, by the transmit end, a target area corresponding to a beam that is to be sent to the receive end; and
    using, by the transmit end, the beam that is in a beam set of the transmit end and that is located in the target area, as the training beam set.

5. The method according to claim 4, wherein before the determining, by the transmit end, a target area corresponding to a beam that is to be sent to the receive end, the method further comprises:
    receiving, by the transmit end, notification information sent by the receive end, wherein the notification information comprises information about the target area.

6. The method according to claim 1, wherein the sending, by the transmit end, a combination vector of the training beam set to the receive end comprises:
    sending, by the transmit end, a basic combination vector and cyclic shift information of the training beam set to the receive end, wherein the combination vector of the training beam set is obtained by performing cyclic shift processing on the basic combination vector by using the cyclic shift information.

7. The method according to claim 1, wherein before the sequentially sending, by the transmit end, the training beams in the training beam set to the receive end, the method further comprises:
    sending, by the transmit end to the receive end, information that indicates a codebook set of the training beam in the training beam set, wherein
    the codebook set specifies a codebook used by each training beam in the training beam set.

8. The method according to claim 1, wherein before the sequentially sending, by the transmit end, the training beams in the training beam set to the receive end, the method further comprises:
    sending, by the transmit end, a determined quantization method for the training beam to the receive end, wherein the quantization method is that indicates phase quantization information and amplitude quantization information of the training beam in the training beam set.

9. A base station, comprising:
    a processor, configured for the base station to determine a training beam set to be sent to a terminal, wherein the training beam set comprises at least one training beam;
    a transmitter, configured for the base station to send, to the terminal, indication information indicating a combination vector of the training beam set, wherein the combination vector of the training beam set indicates a phase and amplitude weight value of each training beam in the training beam set; and configured for the base station to sequentially send the training beams in the training beam set to the terminal.

10. The base station according to claim 9, further comprising:
    a receiver, configured for the base station to receive angle-of-departure information of the training beam set, fed back by the terminal; and
    the processor is further configured for the base station to determine, according to the angle-of-departure information, a transmit beam that reaches the terminal.

11. The base station according to claim 9, wherein the transmitter is further configured for the base station to do at least one of:
    send the combination vector of the training beam set to the terminal; and
    send a column quantity of a combination vector set of the training beam set to the terminal.

12. The base station according to claim 9, wherein the processor is further configured for the base station to:
    determine a target area corresponding to a beam that is to be sent to the terminal; and
    use the beam that is in a beam set of the base station and that is located in the target area, as the training beam set.

13. A terminal, comprising:
    a receiver, configured to receive indication information indicating a combination vector of a training beam set and that is sent by a base station, wherein the combination vector of the training beam set indicates a phase and amplitude weight value of each training beam in the training beam set; and
    a processor, configured to obtain a weight value of each training beam in the training beam set according to the combination vector of the training beam set, and configured to sequentially receive, according to the phase and amplitude weight value of each training beam in the training beam set, the training beams in the training beam set that are sent by the base station.

14. The terminal according to claim 13, wherein:
the processor is configured to compute angle-of-departure information of the training beam set; and the terminal further comprising:
a transmitter, configured to feed back the angle-of-departure information of the training beam set to the base station, wherein the angle-of-departure information is used by the base station to determine, according to the angle-of-departure information, a transmit beam that reaches the terminal.

15. The terminal according to claim 13, wherein the receiver is specifically configured to do at least one of:
receive the combination vector of the training beam set, sent by the base station; and
receive a column quantity of a combination vector set of the training beam set, sent by the base station.

16. The terminal according to claim 13, wherein the receiver is further configured to:
receive a determined target area corresponding to a beam and that is sent by the base station, wherein the target area is that indicates the training beam set that the base station determines to send to the terminal.

17. The terminal according to claim 13, wherein the receiver is specifically configured to:
receive a basic combination vector and cyclic shift information of the training beam set that are sent by the base station; and
perform cyclic shift processing on the basic combination vector by using the cyclic shift information, to obtain the combination vector of the training beam set.

18. The terminal according to claim 13, wherein the receiver is further configured to:
receive information indicating a codebook set of the training beam in the training beam set and that is sent by the base station, wherein
the codebook set specifies a codebook used by each training beam in the training beam set.

19. The terminal according to claim 13, wherein the receiver is further configured to:
receive a determined quantization method for the training beam, wherein the quantization method is sent by the base station and is that indicates phase quantization information and amplitude quantization information of the training beam in the training beam set.

* * * * *